(12) United States Patent
Hoofard et al.

(10) Patent No.: US 11,225,824 B2
(45) Date of Patent: Jan. 18, 2022

(54) CONTROL SYSTEMS FOR OPERATION OF LOADING DOCK EQUIPMENT, AND ASSOCIATED METHODS OF MANUFACTURE AND USE

(71) Applicant: ASSA ABLOY Entrance Systems AB, Landskrona (SE)

(72) Inventors: Richard K. Hoofard, Dallas, TX (US); Brett A. Walford, Corinth, TX (US); Stephen Kosek, Fort Worth, TX (US)

(73) Assignee: ASSA ABLOY Entrance Systems AB, Landskrona (SE)

( * ) Notice: Subject to any disclaimer, the term of this patent is extended or adjusted under 35 U.S.C. 154(b) by 1089 days.

(21) Appl. No.: 15/145,605

(22) Filed: May 3, 2016

(65) Prior Publication Data

US 2017/0320685 A1 Nov. 9, 2017

(51) Int. Cl.
*G06F 3/0484* (2013.01)
*E06B 3/44* (2006.01)
*E05F 15/40* (2015.01)
*E05F 15/665* (2015.01)
(Continued)

(52) U.S. Cl.
CPC ............... *E06B 3/44* (2013.01); *E05F 15/40* (2015.01); *E05F 15/665* (2015.01); *G06F 3/04842* (2013.01); *B65G 69/003* (2013.01); *B65G 69/2882* (2013.01); *E05Y 2400/818* (2013.01);
(Continued)

(58) Field of Classification Search
CPC ............. G06F 3/04842; G06F 3/04847; G06F 3/04886; E06B 3/44
See application file for complete search history.

(56) References Cited

U.S. PATENT DOCUMENTS

| 4,009,051 A | 2/1977 | Kazis et al. |
| 4,286,911 A | 9/1981 | Benjamin |
| 4,476,853 A | 10/1984 | Arbogast |

(Continued)

FOREIGN PATENT DOCUMENTS

| DE | 102004037933 B3 | 2/2006 |
| EP | 2215612 B1 | 8/2012 |

(Continued)

OTHER PUBLICATIONS

Kelley Company; Vehicle Restraints brochure; 2008; 8 pages.
(Continued)

*Primary Examiner* — William L Bashore
*Assistant Examiner* — Gregory A Distefano
(74) *Attorney, Agent, or Firm* — Perkins Coie LLP

(57) ABSTRACT

Systems and associated methods for controlling operation of loading dock equipment are disclosed herein. In some embodiments, the system and associated methods can be used to control operation of loading dock equipment (e.g., a vehicle restraint, a dock door, a dock leveler, etc.) according to a preset sequence of operations. The system can include a display screen that sequentially presents a series of graphical control elements (e.g., touch-sensitive buttons) that enable operation of the loading dock equipment in an appropriate sequence. Additionally, the visual appearance and/or sequence of presentation of the graphical control elements indicate the proper sequence of selection to the user, thereby reducing user confusion and simplifying the operation of the loading dock equipment.

34 Claims, 11 Drawing Sheets

(51) Int. Cl.
B65G 69/00 (2006.01)
B65G 69/28 (2006.01)
(52) U.S. Cl.
CPC ....... *E05Y 2400/85* (2013.01); *E05Y 2900/11* (2013.01)

(56) References Cited

U.S. PATENT DOCUMENTS

| | | | |
|---|---|---|---|
| 4,590,118 A | 5/1986 | Yatabe et al. | |
| 4,626,983 A | 12/1986 | Harada et al. | |
| 4,661,758 A | 4/1987 | Whittaker | |
| 4,744,121 A | 5/1988 | Swessel et al. | |
| 4,843,373 A | 6/1989 | Trickle et al. | |
| 4,988,254 A | 1/1991 | Alexander | |
| 5,026,242 A | 6/1991 | Alexander | |
| 5,047,748 A | 9/1991 | Trickle | |
| 5,168,262 A | 12/1992 | Okayama | |
| 5,168,267 A | 12/1992 | Trickle | |
| 5,181,401 A | 1/1993 | Hodan et al. | |
| 5,323,098 A | 6/1994 | Hamaguchi et al. | |
| 5,576,533 A | 11/1996 | Tantraporn | |
| 5,775,107 A | 7/1998 | Sparkman | |
| 5,831,540 A | 11/1998 | Sullivan et al. | |
| 5,886,863 A | 3/1999 | Nagasaki et al. | |
| 5,886,883 A | 3/1999 | Rail | |
| 5,898,585 A | 4/1999 | Sirichote et al. | |
| 6,082,952 A | 7/2000 | Alexander | |
| 6,367,259 B1 | 4/2002 | Timm | |
| 6,369,462 B1 | 4/2002 | Siri | |
| 6,390,245 B1 | 5/2002 | Metz et al. | |
| 6,476,572 B2 | 11/2002 | Lounsbury | |
| 6,543,375 B1 | 4/2003 | Sargent et al. | |
| 6,663,527 B2 | 12/2003 | Phelan et al. | |
| 6,781,516 B2 | 8/2004 | Reynard et al. | |
| 6,787,259 B2 | 9/2004 | Colborn et al. | |
| 6,810,817 B1 | 11/2004 | William | |
| 6,812,849 B1 | 11/2004 | Ancel | |
| 6,917,298 B2 | 7/2005 | Romano et al. | |
| 6,972,226 B2 | 12/2005 | Deppe et al. | |
| 6,975,226 B2 * | 12/2005 | Reynard | B65G 69/001 340/309.5 |
| 7,032,720 B2 | 4/2006 | Jette et al. | |
| 7,045,764 B2 | 5/2006 | Beggs et al. | |
| 7,119,673 B2 | 10/2006 | Eager et al. | |
| 7,162,762 B1 | 1/2007 | Gleason | |
| 7,165,486 B2 | 1/2007 | Alexander et al. | |
| 7,230,819 B2 | 6/2007 | Muchow et al. | |
| 7,256,703 B2 | 8/2007 | Duvernell et al. | |
| 7,264,092 B2 | 9/2007 | Jette | |
| 7,274,300 B2 | 9/2007 | Duvernell et al. | |
| 7,333,016 B2 | 2/2008 | Angel | |
| 7,380,375 B2 | 6/2008 | Maly | |
| 7,730,981 B2 | 6/2010 | McCabe et al. | |
| 7,750,890 B2 | 7/2010 | Fitzgibbon et al. | |
| 7,864,030 B2 | 1/2011 | Jetté et al. | |
| 7,956,718 B2 | 6/2011 | Murphy et al. | |
| 8,112,949 B2 | 2/2012 | Eungard | |
| 8,286,757 B2 | 10/2012 | Nelson et al. | |
| 8,307,589 B2 | 11/2012 | Eungard et al. | |
| 8,307,956 B2 | 11/2012 | Andersen et al. | |
| 8,345,010 B2 | 1/2013 | Fitzgibbon et al. | |
| 8,407,842 B2 | 4/2013 | Story et al. | |
| 8,410,895 B2 | 4/2013 | Murphy et al. | |
| 8,490,669 B2 | 7/2013 | Fletcher et al. | |
| 8,497,761 B2 * | 7/2013 | McNeill | B65G 69/005 340/5.7 |
| 8,510,888 B2 | 8/2013 | Eungard | |
| 8,547,234 B2 | 10/2013 | Maly et al. | |
| 8,590,087 B2 | 11/2013 | Swessel et al. | |
| 8,590,674 B2 | 11/2013 | Jette et al. | |
| 8,775,710 B1 * | 7/2014 | Miller | G06F 1/1626 361/679.17 |
| 8,893,764 B2 | 11/2014 | Vohla et al. | |
| 8,976,006 B2 | 3/2015 | Krupke et al. | |
| 9,230,419 B2 | 1/2016 | Beggs et al. | |
| 9,564,072 B2 | 2/2017 | Senfleben et al. | |
| 9,633,537 B2 | 4/2017 | Beggs et al. | |
| 9,771,225 B2 | 9/2017 | Stone et al. | |
| 9,776,511 B2 | 10/2017 | Brooks et al. | |
| 9,777,529 B2 | 10/2017 | McNeill et al. | |
| 9,926,148 B2 | 3/2018 | Hochstein et al. | |
| 10,032,380 B2 | 7/2018 | Mushynski et al. | |
| 10,053,904 B2 | 8/2018 | McNeill et al. | |
| 10,096,187 B2 | 10/2018 | Deneen et al. | |
| 2002/0089427 A1 | 7/2002 | Aratani et al. | |
| 2003/0167238 A1 | 9/2003 | Zeif et al. | |
| 2005/0102042 A1 | 5/2005 | Reynard et al. | |
| 2005/0126081 A1 | 6/2005 | Patel et al. | |
| 2005/0262549 A1 | 11/2005 | Ritt et al. | |
| 2006/0137261 A1 | 6/2006 | Maly | |
| 2006/0181391 A1 | 8/2006 | McNeill et al. | |
| 2006/0235737 A1 | 10/2006 | Fleurant et al. | |
| 2007/0157614 A1 | 7/2007 | Goldman | |
| 2007/0283806 A1 | 12/2007 | Morrison | |
| 2008/0011799 A1 | 1/2008 | Chang | |
| 2008/0022596 A1 | 1/2008 | Boerger et al. | |
| 2008/0127435 A1 | 6/2008 | Maly et al. | |
| 2008/0143290 A1 | 6/2008 | Chavakula | |
| 2010/0146719 A1 | 6/2010 | Swessel et al. | |
| 2011/0075441 A1 | 3/2011 | Swessel et al. | |
| 2011/0203059 A1 | 8/2011 | Whitley et al. | |
| 2011/0313893 A1 | 12/2011 | Weik, III | |
| 2012/0025964 A1 | 2/2012 | Beggs et al. | |
| 2012/0304558 A1 | 12/2012 | Iglesias et al. | |
| 2013/0024334 A1 | 1/2013 | Kozlay | |
| 2013/0327914 A1 | 12/2013 | McNeill et al. | |
| 2013/0332217 A1 | 12/2013 | McNeill et al. | |
| 2014/0075842 A1 | 3/2014 | McNeill et al. | |
| 2014/0247347 A1 | 9/2014 | McNeill et al. | |
| 2015/0047132 A1 | 2/2015 | Sveum et al. | |
| 2015/0047133 A1 | 2/2015 | Sveum | |
| 2016/0104364 A1 | 4/2016 | Brooks et al. | |
| 2017/0017392 A1 * | 1/2017 | Castaneda | G06F 3/02 |
| 2017/0043967 A1 | 2/2017 | Walford et al. | |
| 2017/0044817 A1 | 2/2017 | McNeill et al. | |
| 2017/0320685 A1 | 11/2017 | Hoofard et al. | |
| 2018/0035606 A1 | 2/2018 | Burdoucci | |
| 2019/0002216 A1 | 1/2019 | Walford et al. | |

FOREIGN PATENT DOCUMENTS

| | | |
|---|---|---|
| EP | 2660170 A1 | 11/2013 |
| FR | 2869470 A1 | 10/2005 |
| WO | 2006066013 A2 | 6/2006 |
| WO | 2006076538 | 7/2006 |
| WO | 2006076538 A2 | 7/2006 |
| WO | 2008014206 A1 | 1/2008 |
| WO | WO2008036087 | 3/2008 |
| WO | 2009070509 A1 | 6/2009 |
| WO | WO2010077977 | 7/2010 |
| WO | 2011037839 A1 | 3/2011 |
| WO | 2015023666 | 2/2015 |
| WO | 2015023669 | 2/2015 |
| WO | 2015166339 A1 | 4/2015 |
| WO | 2016007321 A1 | 1/2016 |

OTHER PUBLICATIONS

Model G307K2 Kadet2 Operator Interface with 7" TFT Display, Red Lion Controls, Inc., Nov. 23, 2015, 4 pages.
Rite-Hite Corporation, Rite-Vu Light Communication Systems Brochure, 6 pages [Not dated].
Serco Vehicle Restraints brochure; 2008; 4 pages.
Serco; Loading Dock Solutions brochure; 2008; 8 pages.
Smart Power Systems International GmbH, Web pages for Hybrid DC/AC Power Supply, Jun. 1, 2004.
"Dock Lighting Goes Green with the FT Ultra LED Docklight," APS Resource, News Release. Mar. 13, 2009, 1 page.
"Pentalift Introduces Industry's First Solar Powered Dock Leveler!" www.pentalift.com, Jun. 14, 2011, 1 page.
"APS&GO—LED Communication System Specification", APS Resource, For APS1102, Sep. 30, 2011, 2 pages.

(56) References Cited

OTHER PUBLICATIONS

"Energy Saving Products", APS Resource Brochure, Apr. 10, 2018, 4 pages.
"FT Ultra LED Flex Arm Docklight Specification", APS Resource, Form APS 1168, Sep. 30, 2011, 2 pages.
"High Impact LED Dock Light Specification Sheet", APS Resource, Form APS1171, Sep. 30, 2011, 2 pages.
"Kelley: A History of Innovation", Kelley Company Product Brochure, 2008, 8 pages.
"Manual and Automatic Light Communication Systems: User's Manual", Serco, Oct. 2009, 28 pages.
"Safety & Lighting Products", APS Resource Brochure, Apr. 2009, 2 pages.

\* cited by examiner

CONTROL SYSTEMS FOR OPERATION OF LOADING DOCK EQUIPMENT, AND ASSOCIATED METHODS OF MANUFACTURE AND USE

TECHNICAL FIELD

The following disclosure relates generally to systems and methods for controlling the operation of loading dock equipment and, more particularly, to control panels for operating loading dock equipment.

BACKGROUND

Conventional loading docks typically include an elevated opening covered by an overhead door in the side of a warehouse or other building. To unload or load a trailer or other transport vehicle, the doors on the back of the vehicle are opened and the vehicle is backed up to the loading dock door. A vehicle restraint (e.g., a mechanical hook, wheel chock, etc.) is employed to hold the vehicle in position in front of the loading dock door. The loading dock door is then raised, and a dock leveler is extended between the floor of the warehouse and the open end of the vehicle. Conventional dock levelers typically include a deck that rotates into position as a lip on the front edge of the deck extends outwardly and comes to rest on the bed of the vehicle. Once the dock leveler has been properly positioned, workers, forklifts, etc. can move back and forth over the dock leveler to unload and/or load goods and materials to and from the vehicle. Once the unloading and/or loading process is complete, the dock leveler can be raised and stowed and the loading dock door can be closed. The vehicle restraint is then disengaged from the vehicle so that the vehicle can pull away from the loading dock.

Loading dock equipment is typically controlled via a control panel positioned adjacent to the loading dock door inside the building. Conventional control panels typically include mechanical or pressure membrane controls that enable dock operators to control operation of the various pieces of loading dock equipment described above, and they can also include indicator lights to communicate equipment status. The controls and indicator lights are typically arranged on the face of the control panel in a logical manner and present the operator with a variety of choices and decisions to determine the particular operation he or she wants to perform. Examples of existing control panels are disclosed in U.S. Pat. No. 6,975,226, which is incorporated herein in its entirety by reference.

By way of example, FIG. 1 is a front view of a loading dock equipment control panel 100 configured in accordance with the prior art. The control panel 100 includes a vehicle restraint engage button 102a and a corresponding vehicle restraint release button 102b, as well as a restraint override selector knob 104. The control panel 100 also includes a series of indicator lights 120a-c (which may be referred to as operator signal lights) that can be illuminated in red, amber and green, respectively, to indicate status of the vehicle restraint in a known manner. The control panel 100 further includes a shelter selector knob 106 that enables the dock operator to inflate or deflate the dock shelter, and a loading light selector knob 116 that enables the operator to turn the dock lights on and off. Additionally, the control panel 100 includes a door open button 108a, a corresponding door close button 108b, and a door stop button 110 that enables the operator to open, close, and stop the loading dock door, respectively, as desired. The control panel 100 also includes controls for operating a dock leveler and a safety gate. More specifically, the control panel 100 includes a safety gate selector knob 118 for raising and lowering the safety gate, a dock leveler raise button 112 and a corresponding lip extend button 114. The control panel 100 can additionally include an air curtain selector knob 124 for controlling operation of an air curtain positioned over the dock opening, and a guide light selector knob 126 to turn on/off guide lights mounted outside the dock to assist vehicle operators when parking transport vehicles at the dock. In addition to the foregoing features, the control panel 100 also includes an emergency stop button 122. The operator can depress the emergency stop button 122 at any time to immediately stop operation of the dock equipment.

As described above, conventional control panels can include a large number of operational choices for the dock operator. This can lead to operator confusion regarding which controls to actuate at any given time, which in turn can lead to operator errors and delays. One way to address this with conventional control panels is to interlock the various pieces of loading dock equipment, so that only certain operations can be performed at particular points in the loading dock sequence. For example, the panel 100 can be configured to require the sequential operation of the loading dock equipment as follows: First, the vehicle restraint is engaged, which must occur before the dock shelter is inflated, which must occur before the dock door is opened, which must occur before the dock leveler is moved into position in the vehicle, which must occur before the dock light is turned on. Even with interlocked control panels, however, the dock operator may waste a significant amount of time trying to actuate the wrong controls or trying to determine which controls should be actuated. In other control panels, it is possible to completely automate the control process so that the operator only has to depress one button to initiate the sequence of operations outlined above. Alternatively, the loading dock sequence can begin automatically when a certain condition occurs (e.g., once the vehicle restraint is properly engaged with the vehicle). These types of control panels, however, do not allow any flexibility in the operational sequence and must be designed at the outset for use with a particular loading dock configuration.

Accordingly, it would be advantageous to provide control panels for loading dock equipment that overcome the shortcomings of conventional panels and simplify the operation of loading dock equipment.

DETAILED DESCRIPTION

Figure 1:
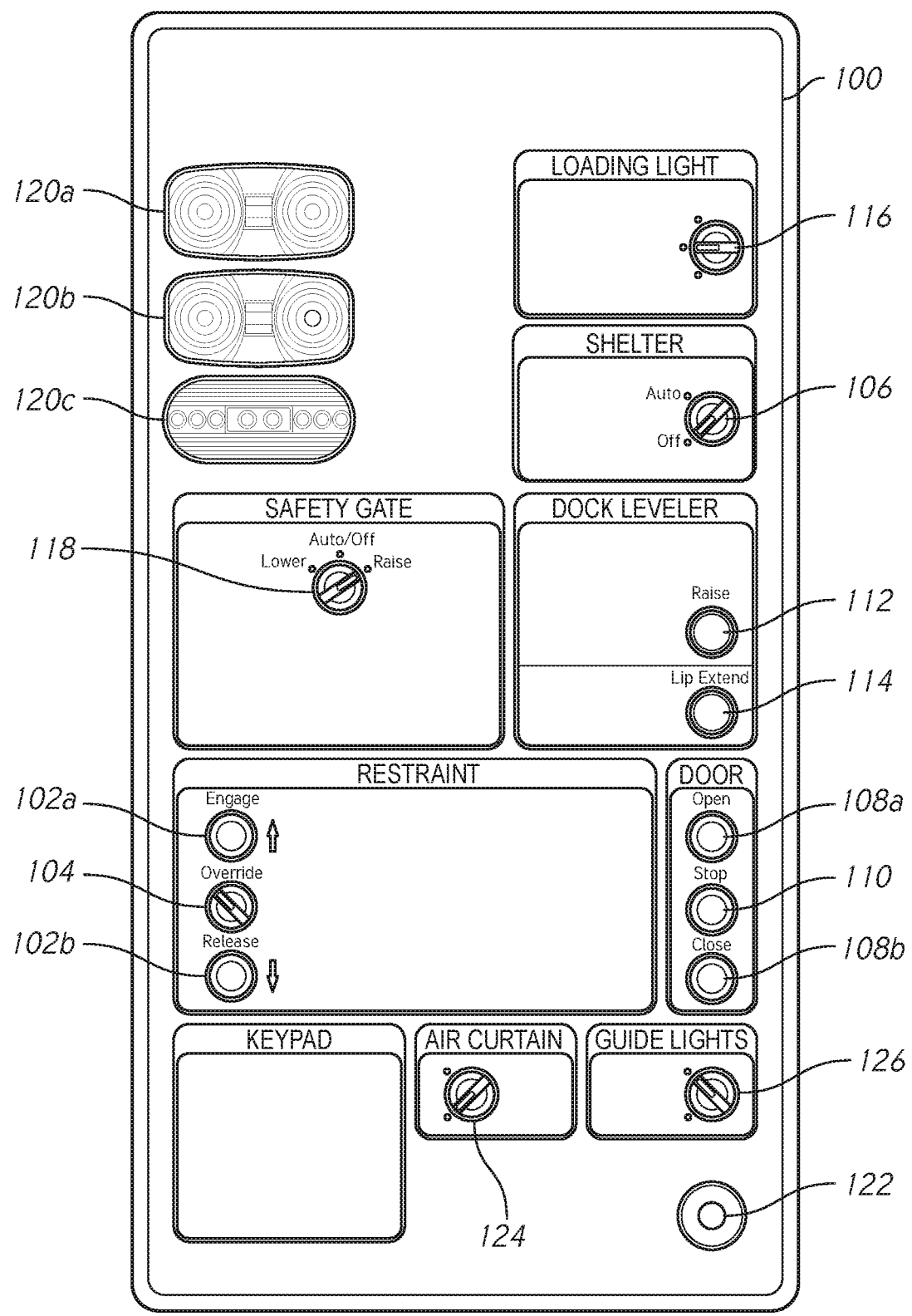
FIG. 1 is a front view of a loading dock equipment control panel configured in accordance with the prior art.

The following disclosure describes various embodiments of systems and methods for controlling the operation of loading dock equipment. The systems can include a control panel having a touchscreen interface configured to receive operator inputs for controlling operation of loading dock equipment. More specifically, in some embodiments the touchscreen is configured so that it only presents the dock operator with operational choices that are appropriate to accomplish a preset sequence of operation of the loading dock equipment. For example, as described in greater detail below, the touchscreen can be configured so that it first presents the operator with control elements (e.g., touch-sensitive graphics, such as buttons or icons, textual prompts, etc.) for operating the vehicle restraint, while controls for the other pieces of loading dock equipment are either not present and/or are identified by visual representation to be inoperative. After the vehicle restraint has been properly engaged and, for example, the inflatable shelter has been properly inflated, the touchscreen can display control elements that enable the operator to raise the dock door, while not displaying functional control elements for the other pieces of loading dock equipment. Similarly, after the dock door has been raised, the touchscreen can then display only control elements for installing the dock leveler in the shipping vehicle. Embodiments of the present technology can also provide flexibility by allowing the dock operator to stop or reverse the dock sequence at any point.

Accordingly, touchscreens configured in accordance with the present technology can be configured so that the dock operator can easily follow a sequence of loading dock equipment operation in which only one set of equipment controls are displayed on the screen at any given time. By only displaying controls for operation of the appropriate piece (or pieces) of loading dock equipment at any particular time, the touchscreen control panels described herein reduce confusion and simplify the operation and status of loading dock equipment, which in turn saves time and reduces the likelihood of operational errors.

Certain details are set forth in the following description and in FIGS. 1-7 to provide a thorough understanding of various embodiments of the present technology. In other instances, well-known structures, materials, operations and/or systems often associated with loading dock equipment, loading dock control panels, computer displays, touchscreens, etc. are not shown or described in detail in the following disclosure to avoid unnecessarily obscuring the description of the various embodiments of the technology. Those of ordinary skill in the art will recognize, however, that the present technology can be practiced without one or more of the details set forth herein, or with other structures, methods, components, and so forth.

The accompanying Figures depict embodiments of the present technology and are not intended to be limiting of its scope. Component details may be abstracted in the Figures to exclude details such as the position of components and certain precise connections between such components when such details are unnecessary for a complete understanding of how to make and use the invention. The sizes of various depicted elements are not necessarily drawn to scale, and these elements may be arbitrarily enlarged to improve legibility. Additionally, many of the details, dimensions, angles and other features shown in the Figures are merely illustrative of particular embodiments of the disclosure. Accordingly, other embodiments can have other details, dimensions, angles and features without departing from the spirit or scope of the present invention. Those of ordinary skill in the art will appreciate that further embodiments of the invention can be practiced without several of the details described below.

In general, identical reference numbers in the Figures identify identical, or at least generally similar, elements. To facilitate the discussion of any particular element, the most significant digit or digits of any reference number refers to the Figure in which that element is first introduced. For example, element 210 is first introduced and discussed with reference to FIG. 2.

Figure 2A:
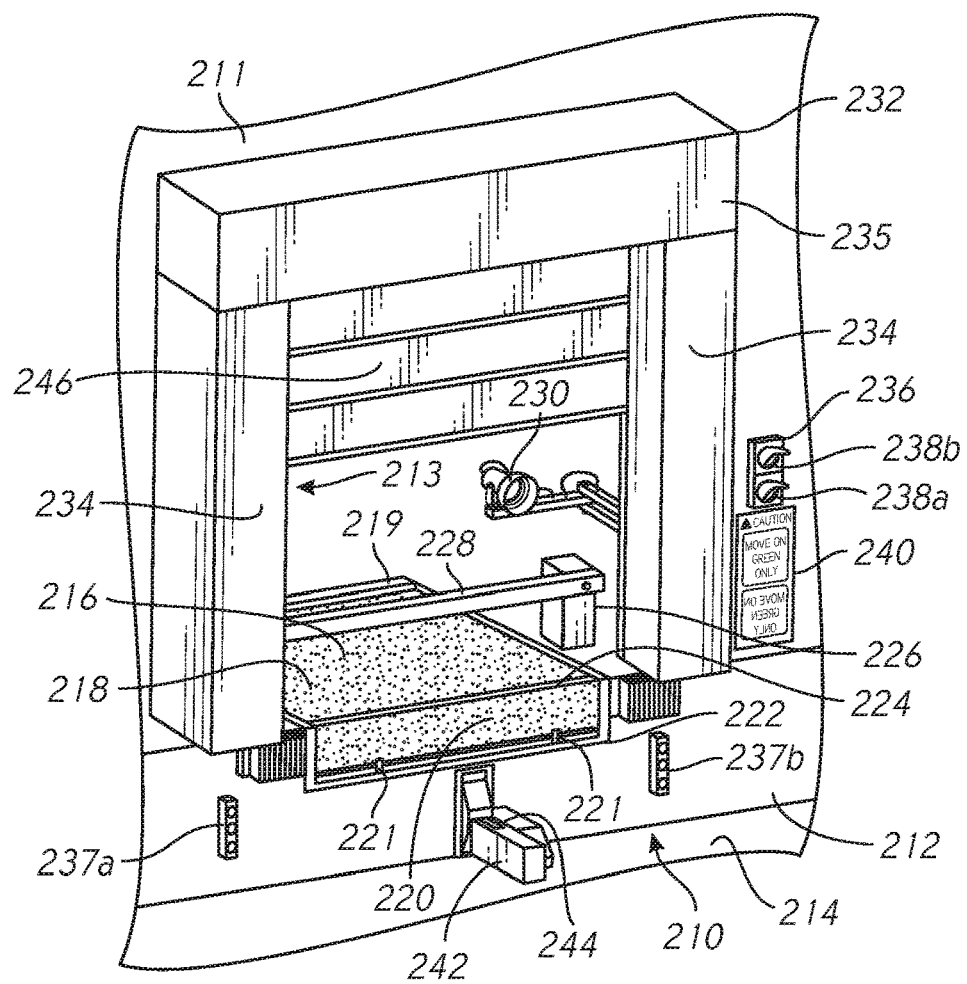
FIG. 2A is an exterior isometric view of a loading dock having a control panel configured in accordance with an embodiment of the present technology.
Figure 2B:
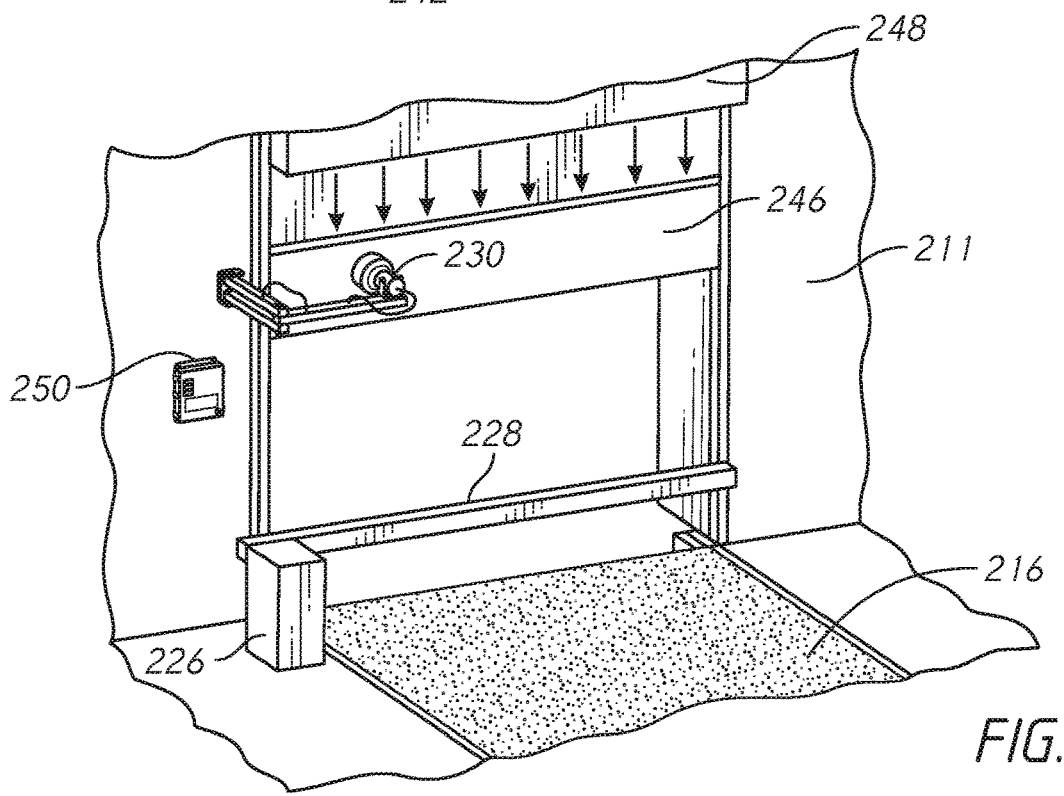
FIG. 2B is an interior isometric view of the loading dock of FIG. 2A.

FIGS. 2A and 2B are exterior and interior isometric views, respectively, of a loading dock 210 having a control panel 250 configured in accordance with an embodiment of the present technology. Referring to FIGS. 2A and 2B together, in the illustrated embodiment the loading dock 210 includes a driveway 214 in front of an elevated opening 213 in a warehouse or other building 211. The opening 213 can include a barrier gate 226 positioned directly behind a door 246 (e.g., a powered roll-up or overhead door), which is shown partially open. The barrier gate 226 includes a barrier arm 228 that can be electrically operated to rotate from a horizontal, blocking position as shown to a vertical, open position in a known manner. A vehicle restraint 242 (e.g., an electrically-actuated mechanical restraint) is mounted to, or near, a dock face 212 and includes a movable hook 244. The hook 244 can be raised to engage a rear impact guard ("RIG") of a truck or tractor trailer (not shown) to secure the vehicle at the loading dock 210 in a known manner and prevent, for example, inadvertent "early departure" and/or "trailer creep" away from the dock face 212 during the loading or unloading process. After loading/unloading, the hook 244 can be lowered or otherwise retracted to release the vehicle.

In the illustrated embodiment, the loading dock 210 further includes a dock shelter 232. The dock shelter 232 can include inflatable side members 234 extending vertically along each side of the opening 213, and an inflatable head member 235 extending horizontally across the top of the opening 213. Prior to use, the side members 234 and the head member 235 can be at least partially deflated. After a trailer backs into the loading dock 210 and is engaged by the vehicle restraint 242, the side members 234 and the head member 235 can be inflated (via, e.g., an electrically-driven air pump) to form an environmental seal between the trailer and the dock wall in a known manner. In other embodiments, the loading dock 210 can include other types of dock seals (e.g., compressible foam seals) in place of, or in addition to, the dock shelter 232, or a dock shelter can be omitted.

The loading dock 210 also includes a dock leveler 216 (e.g., a hydraulic dock leveler) positioned adjacent to the opening 213. The dock leveler 216 includes a deck 218 pivotally attached to a frame 219 at the rear of a pit 222 formed in the floor of the building 211. A lip 220 is pivotally attached to a forward edge portion of the deck 218 via one or more hinges 224. In the stored position shown, the outer edge portion of the lip 220 is supported by keepers 221 mounted at the front of the pit 222 near the dock face 212. In operation, the deck 218 first rotates upwardly away from the pit 222, and then downwardly as the lip 220 rotates outward and eventually comes to rest on the bed of a truck or trailer (not shown) parked at the loading dock 210. Once installed, the deck 218 and the lip 220 provide a ramp for dock workers, fork lifts, etc. to move back and forth and transfer goods, materials, etc. into and/or out of the vehicle. A dock light 230 can be movably mounted to an interior wall of the building 211 to one side of the opening 213 to illuminate the interior of the vehicle during the loading and/or unloading process. Additionally, an air curtain 248 (having, e.g., an electrically-driven blower fan) can be positioned above the opening 213 and configured to direct a "curtain" of air downwardly across the opening 213 to prevent air and/or contaminants from flowing between the building 211 and the vehicle when the dock door 246 is open.

As shown in FIG. 2A, a signal light assembly 236 can be mounted to the building 211 adjacent the opening 213 to provide visual signals to vehicle drivers. For example, the signal assembly 236 can include a green light 238a that, when illuminated, indicates to a vehicle driver that it is safe to back a trailer up to the loading dock 210. Or, if the vehicle is already at the loading dock 210, the green light 238a indicates that the vehicle restraint 242 has been disengaged from the trailer and it is safe to move the vehicle away from the loading dock 210. The light assembly 236 can also include a red light 238b that, when illuminated, indicates to a vehicle driver that the restraint 242 is engaged with the trailer and it is therefore not safe to move the vehicle away from the loading dock 210. These instructions can be posted in writing on a sign 240 positioned adjacent to the signal light assembly 236. In addition to the signal lights 238a, b, in some embodiments the loading dock 210 can also include a first guide light 237a mounted to the dock face 212 on one side of the opening 213, and a second guide light 237b mounted to the dock face 212 on the opposite side of the opening 213. The guide lights 237a, b are positioned so that they can be illuminated and easily viewed by vehicle drivers with rear view mirrors to help them align their trailers with the opening 213 as they back the trailers up to the loading dock 210.

The various pieces of loading dock equipment and associated systems described above (e.g., the vehicle restraint 242, the light assembly 236, the dock shelter 232, the door 246, the loading light 230, the air curtain 248, the dock leveler 216 and the barrier gate 226) can be at least generally similar in structure and function to conventional loading dock equipment well known in the art. For example, the loading dock equipment described above can be at least generally similar in structure and function to loading dock equipment described in: U.S. Pat. Nos. 8,893,764; 8,510,888; 8,490,669; 8,407,842; 8,307,589; 8,181,401; 8,112,949; 7,165,486; 7,119,673; 6,082,952; and 5,831,540; U.S. Provisional Application No. 61/988,081, filed May 2, 2014, and titled SYSTEMS AND METHODS FOR AUTOMATICALLY CONTROLLING LOADING DOCK EQUIPMENT; and PCT Application No. PCT/IB2015/000698, filed Apr. 30, 2015, and titled SYSTEMS AND METHODS FOR AUTOMATICALLY CONTROLLING LOADING DOCK EQUIPMENT; each of which is incorporated herein in its entirety by reference.

As shown in FIG. 2B, in the illustrated embodiment the control panel 250 is mounted to an interior wall of the building 211 to one side of the dock door 246 at about eye level. The control panel 250 is operably connected (via, e.g., wired connections) to the loading dock equipment described above. As described in greater detail below, the control panel 250 includes an "intelligent" graphical user interface (that can include, e.g., a touchscreen) that enables the dock operator to quickly and easily operate the loading dock equipment to safely engage a truck or trailer for unloading and/or loading, and then safely release the vehicle and secure the dock area after the unloading/loading process.

Figure 3:
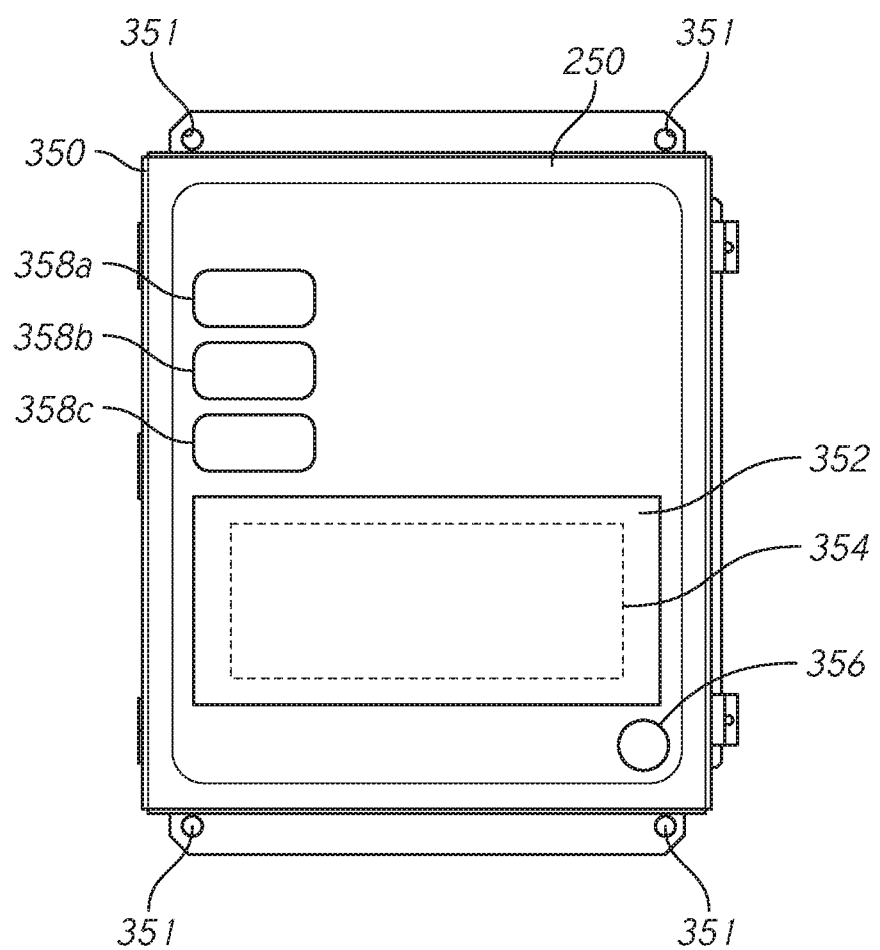
FIG. 3 is a front view of a loading dock equipment control panel configured in accordance with an embodiment of the present technology.

FIG. 3 is an enlarged front view of the control panel 250 configured in accordance with an embodiment of the present technology. In the illustrated embodiment, the control panel 250 is mounted to the front of a generally rectangular housing 350 that can accommodate the electrical, mechanical, and processing components associated with the control panel 250. The housing 350 can include a plurality of mounting holes 351 for fastening or otherwise attaching the control panel 250 to a wall or other suitable location proximate the loading dock 210.

The control panel 250 includes a display screen 352 that can present a series of graphical user interfaces (GUI's) for control of loading dock equipment. More specifically, in the illustrated embodiment the display screen 352 includes a touchscreen portion ("touchscreen 354") that displays graphical and/or textual symbols, characters and/or other elements that facilitate user operation of the control panel 250. In other embodiments, the touchscreen 354 can encompass the entire display screen 352. The touchscreen 354 can be any suitable electronically-displayed, touch-sensitive user input device known in the art, including, for example, a touchscreen utilizing resistive or capacitive technologies. As is known, capacitive touchscreens operate by sensing the electrical properties of a human touch, while resistive touchscreens operate by sensing direct pressure applied by the user. The display screen 352 can be, for example, an LCD or an LED display. In other embodiments, the touchscreen 354 and/or the display screen 352 can include other known user input and/or visual display technologies without departing from the present disclosure. For example, in other embodiments the touchscreen 354 can utilize acoustic, infrared, and/or other touchscreen technologies, and the display screen 352 can be an ELD, an OLED, and/or other electronic display device known in the art.

In addition to the touchscreen 354, the control panel 250 further includes a series of indicator lights 358a-358c. In the illustrated embodiment, the indicator lights 358a-358c have red, amber and green colored lenses, respectively, and project the corresponding colors as visual signals that indicate the status of the vehicle restraint 242 (FIG. 2A). More specifically, if the red light 358a is illuminated, this indicates that the vehicle restraint 242 is not engaged with a vehicle parked at the loading dock 210, and thus it is not safe to open the dock door 246 and/or otherwise attempt to cross the loading dock threshold into the vehicle at this time. If the amber light 358b is illuminated, this indicates to the dock operator that the vehicle restraint 242 is in an override mode, and thus after the operator has confirmed that the vehicle's wheels have been chocked or the vehicle has otherwise been suitably restrained at the loading dock, the operator can proceed with unloading and/or loading with due caution. If the green light 358c is illuminated, this indicates that the vehicle restraint 242 has been properly engaged with the vehicle and the unloading and/or loading process can safely proceed. In addition to the foregoing features, the control panel 250 also includes an emergency stop button 356. The emergency or "E-stop" button 356 can be depressed by the operator at any time to immediately stop operation of any loading dock equipment that happens to be in motion at that time.

Figure 4:
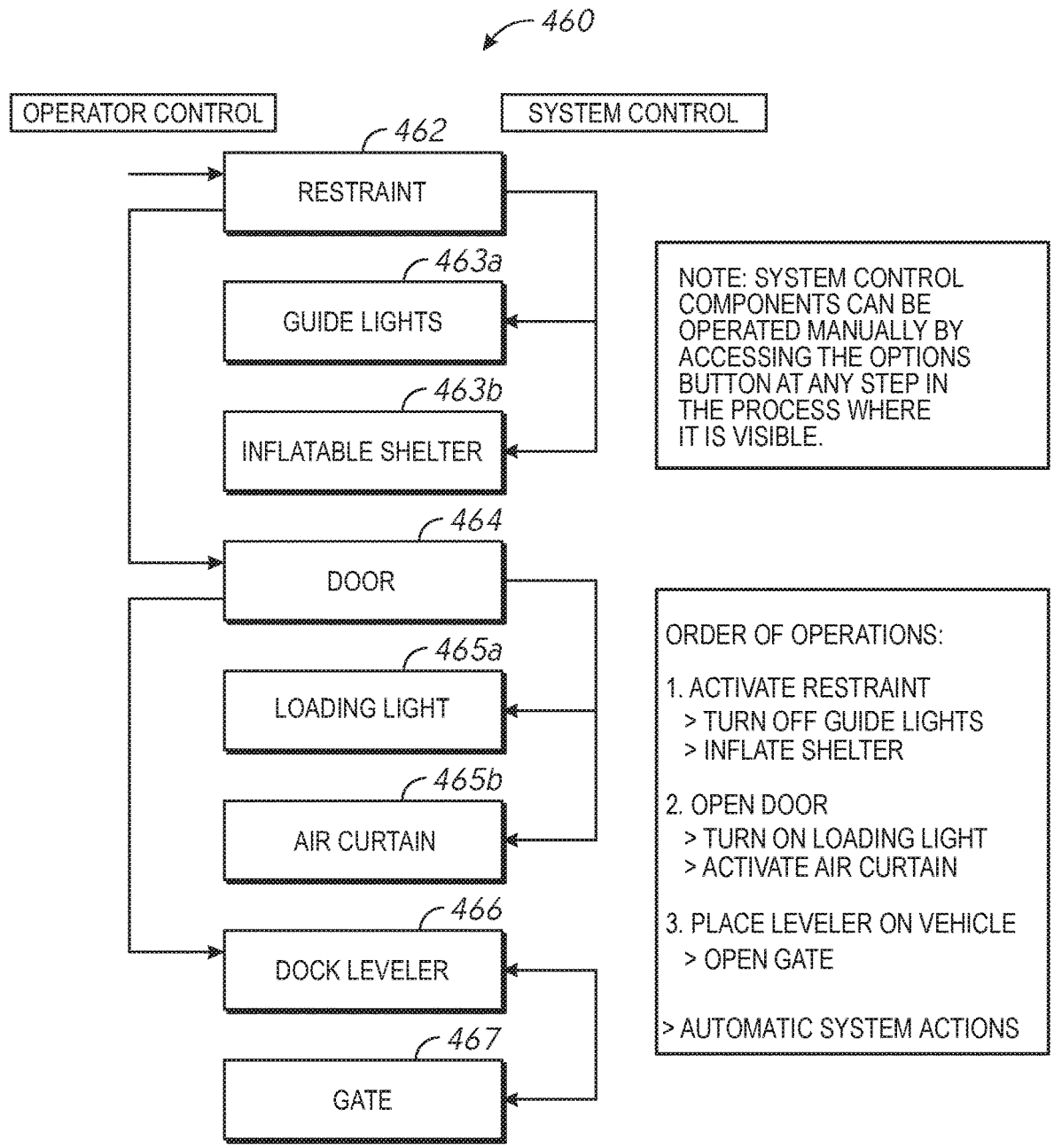
FIG. 4 is a flow diagram of a routine for operating loading dock equipment with a control panel configured in accordance with an embodiment of the present technology.

FIG. 4 is a flow diagram of an operational sequence 460 that can be implemented by the control panel 250 in accordance with an embodiment of the present technology. More specifically, as noted above, the touchscreen 354 (FIG. 3) can be configured to sequentially display a series of graphical control elements that only enable the operator to control an appropriate piece of loading dock equipment at any given time, while at the same time either not displaying (or displaying in a way that indicates inoperability) graphical control elements associated with other pieces of loading dock equipment that are interlocked to prevent operation out of sequence. By only displaying appropriate options at any given time, the control panel 250 reduces the possibility of the operator being confused about which piece of loading dock equipment should be operated next, and enables the operator to quickly execute the appropriate sequence of dock equipment operations.

In FIG. 4, operator control inputs (i.e., operator inputs to the control panel 250) are illustrated by the arrows on the left side of the operational sequence 460, and system control inputs (i.e., automatic control inputs provided by the control panel 250) are illustrated by the arrows on the right side of the operational sequence 460. In the illustrated embodiment, the operational sequence 460 begins in block 462 with the touchscreen 354 displaying graphical control elements for operation of the vehicle restraint 242 (FIG. 2A), while not providing control elements for operation of the other loading dock equipment, such as the door 246 or the dock leveler 216. Additionally, in some embodiments the touchscreen 354 can also display an "options" button that enables the operator to manually control a particular piece of loading dock equipment or component. Thus, at the beginning of the sequence the operator's only option is to select (e.g., touch) a graphical control element (e.g., a button) for control of the vehicle restraint 242, or to select an "options" button. For example, as described in greater detail below, the operator may select an "engage" button displayed by the touchscreen 354 to cause the vehicle restraint 242 to engage a trailer parked at the loading dock 210. Assuming that the guide lights 237a, b (FIG. 2A) were illuminated to aid the driver in parking the vehicle, after the vehicle has been properly restrained the controller 250 can automatically turn off the guide lights 237a, b as noted by block 463a. Additionally, the controller 250 can send a command to the air pump or other appropriate hardware to inflate the dock shelter 232, as illustrated by block 463b.

Once the vehicle restraint 242 has been properly engaged, the guide lights 237a, b have been turned off, and the dock shelter 232 has been inflated, the touchscreen 354 displays one or more graphical control elements that only permit operation of the loading dock door 246, as illustrated by block 464. Once the operator has selected the appropriate button (e.g., a door "raise" button) to raise the dock door 246, the control panel 250 can automatically command the loading light 230 to turn on, as illustrated by block 465a, and can also activate the air curtain 248 (FIG. 2B), as illustrated by block 465b. Once the dock door 246 has been fully raised and the loading light 230 and the air curtain 248 have been turned on, the touchscreen 354 can display one or more graphical control elements that only enable operator to control the dock leveler 216, as illustrated by block 466. More specifically, as described in greater detail below, the touchscreen 354 can display graphical control elements (e.g., buttons) for raising the dock leveler 216 and then lowering it to extend the lip 220 onto the bed of the open trailer. Once the dock leveler 216 has been correctly installed in the vehicle, the control panel 250 sends a command to the barrier gate 226 causing it to automatically raise the barrier arm 228, as illustrated by block 467. After the sequence of operations 460 is complete, dock personnel can begin unloading and/or loading the vehicle from the loading dock 210.

Once the unloading and/or loading process is complete, the touchscreen 354 can display a series of graphical control elements that only enable the sequential control of the loading dock equipment in an appropriate manner to release the vehicle and safely secure the loading dock 210. This operational sequence is essentially the reverse of the sequence 460 illustrated in FIG. 4. For example, releasing the vehicle and securing the loading dock 210 can include first enabling the operator to store the dock leveler 216, after which the controller 250 automatically lowers the barrier gate arm 228. Next, the touchscreen 354 can display graphical control elements that enable the operator to close the dock door 246, while interlocking the other loading dock equipment to prevent inadvertent operation in a way that might be unsafe or damage the equipment. Once the dock door 246 has been fully closed, the control panel 250 can automatically turn off the loading light 230 and the air curtain 248. Next, the touchscreen 354 can display one or more graphical control elements that only enable operation of the vehicle restraint 242, and the operator can select the appropriate control element or elements to disengage the vehicle restraint 242 from the vehicle. Once the vehicle has been properly disengaged, the control panel 250 can automatically deflate the dock shelter 232 and, if necessary, turn on the guide lights 237a, b for the next trailer.

FIG. 4 is a representative flow diagram that depicts processes used in some embodiments. The flow diagram may not show all functions or exchanges of data, but instead provides an understanding of commands and data exchanged under embodiments of the system. Those skilled in the relevant art will recognize that some functions or exchange of commands and data may be repeated, varied, omitted, or supplemented, and other (less important) aspects not shown may be readily implemented. Moreover, each of the steps depicted in FIG. 4 can itself include a sequence of operations that need not be described herein. Those of ordinary skill in the art can create source code, microcode, program logic arrays or otherwise implement the invention based on the flow diagram of FIG. 4 and the detailed description provided herein for programming the control panel 250. It should be noted that FIG. 4 depicts a particular sequence of loading dock operations by way of example only, and in other embodiments the control panel 250 can be programmed to control loading dock equipment in virtually any particular order or sequence that a dock operator or other user may desire. Additionally, the present technology can be implemented to control various combinations of loading dock equipment, and not only the particular arrangements of equipment described above.

FIGS. 5A-5H are a series of screenshots of the display screen 352 illustrating a series of displays 570a-h that can be sequentially presented by the touchscreen 354 for operation of loading dock equipment in accordance with an embodiment of the present technology. As described in greater detail below, each of the displays 570a-h only provides the operator with the ability to operate a single corresponding piece of loading dock equipment at any given time, and the corresponding piece of loading dock equipment is clearly identified by each display 570a-h to avoid operator confusion about which piece of equipment should be operated next. Moreover, the displays 570a-h only enable the operator or other user to sequentially operate the various pieces of loading dock equipment in an appropriate sequence. For example, in the illustrated embodiment, the displays 570a-h are configured so that the operator must first engage the vehicle restraint 242 with the transport vehicle before opening the dock door 246, and then the operator must open the dock door 246 before moving the dock leveler 216 into position in the vehicle.

Figure 5A:
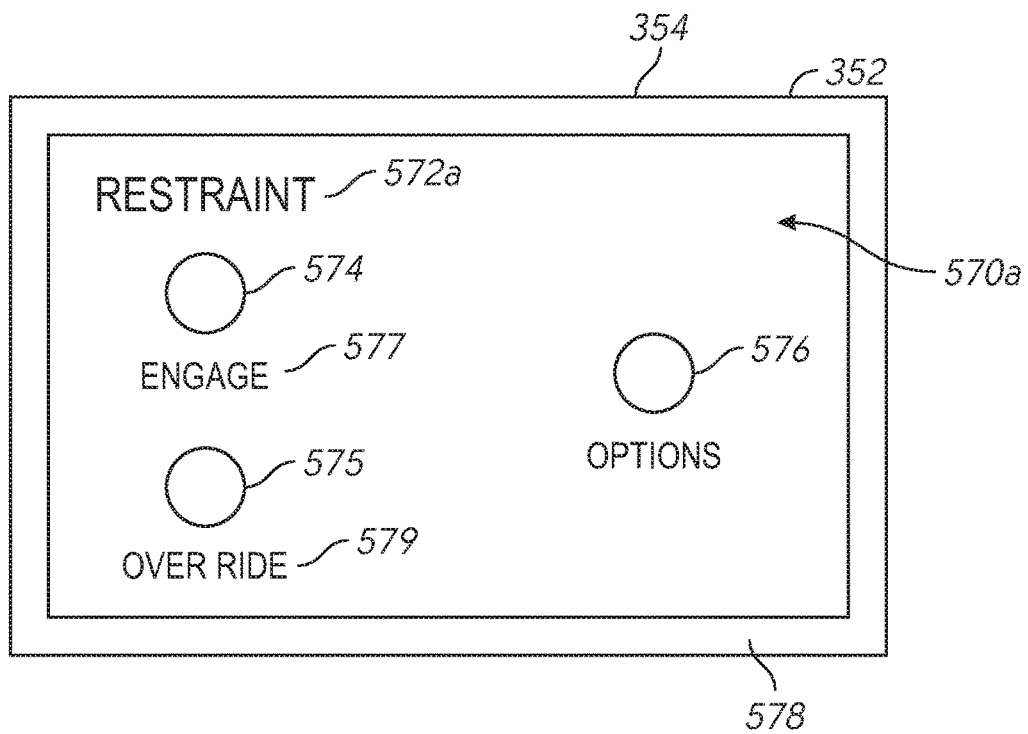
FIGS. 5A-5H are a series of screenshots of a control panel touchscreen for controlling operation of loading dock equipment in accordance with an embodiment of the present technology.

Referring first to FIG. 5A, when there is no vehicle present at the loading dock 210, the touchscreen 354 can provide a visual signal to loading dock operators and other users indicating this status. For example, the touchscreen 354 can display a solid or flashing red color screen in "sleep mode" that indicates no vehicle is present at the loading dock 210. In one embodiment, the presence or absence of a vehicle at the loading dock 210 can be communicated to the control panel 250 via an electrical sensor mounted to the vehicle restraint 242 that indicates when the restraint 242 is engaged with a vehicle. In another embodiment, the touchscreen 354 can be configured to display either a solid or flashing red screen to indicate the absence of a vehicle at the loading dock when the vehicle restraint 242 has been commanded to release. More specifically, if the vehicle restraint 242 has been commanded to release and it has not been overridden, then the control panel 250 can interpret this as the absence of a vehicle at the loading dock 210 and display an appropriate signal via the touchscreen 354. As will be appreciated, a solid or flashing red color is but one example of a visual signal that can be displayed by the touchscreen 354 to indicate the status of the loading dock 210. Accordingly, in other embodiments, other types of visual signals (e.g., other colors, text, etc.) and/or audible signals can be implemented by the control panel 250 to indicate dock status.

When a vehicle approaches or is present at the loading dock 210, the dock operator can touch the touchscreen 354, and the touchscreen 354 will respond by presenting the display 570a. The display 570a includes textual indicators 572a, 577 and 579, and graphical control elements (e.g., buttons) 574, 575 and 576. In the illustrated embodiment, the textual indicator 572a indicates to the operator that the displayed control elements are associated with operation of the vehicle "restraint." More specifically, as indicated by the corresponding textual indicator 577, the graphical control element 574 is an "engage" button that can be touched by the operator to engage the vehicle restraint 242 with the transport vehicle parked at the loading dock 210. While the display 570a is active, the touchscreen 354 can display a red border 578 to indicate to the operator that the restraint 242 has not been engaged with the vehicle yet. Once the operator selects the "engage" button 574 and the vehicle restraint 242 begins operation, the touchscreen 354 can go dark, except for the red border 578 (i.e., the textual indicators and the graphical control elements can be omitted or otherwise rendered inoperable) so that the operator is unable to operate any loading dock equipment while the restraint 242 is in motion.

As indicated by the textual indicator 579, the graphical control element 575 is an "override" button that the operator may select to override the vehicle restraint 242. By way of example, the operator may elect to override the vehicle restraint 242 if the restraint is unable to engage the vehicle properly. In this situation, selecting the "override" button 575 enables the operator to bypass operation of the vehicle restraint 242 and instead chock the vehicle wheels or otherwise restrain the vehicle at the loading dock. Additionally, selecting the "override" button 575 causes the touchscreen 354 to present the display 570b for operation of the dock door 246 after the operator has confirmed that the vehicle is properly restrained.

As described above with reference to FIG. 4, once the vehicle restraint 242 has been engaged (or the vehicle restraint 242 has been overridden), the control panel system can automatically turn off the guide lights 237a, b and inflate the dock shelter 232. Alternatively, the operator can elect to manually operate the guide lights 237a, b and/or the dock shelter 232 by touching the "options" button 576. Doing so will cause the control panel 250 to bring up a corresponding display enabling the operator to manually operate the guide lights 237a, b and/or the dock shelter 232.

Figure 5B:
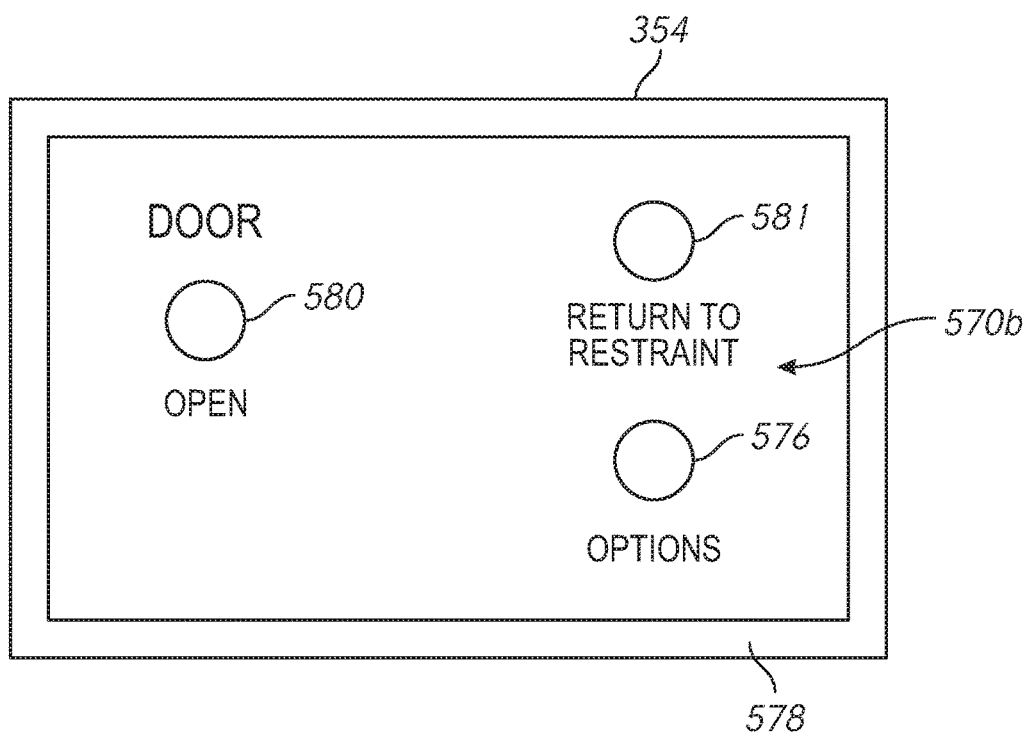

Referring next to FIG. 5B, once the vehicle restraint 242 has been properly engaged with the vehicle, the vehicle restraint 242 can send a corresponding signal to the control panel 250 indicating that the vehicle has been properly secured at the loading dock 210. Additionally, the dock shelter 232 and the guide lights 237a, b can also send corresponding signals to the control panel 250 indicating that the guide lights 237a, b have been turned off and the dock shelter 232 has been inflated. The control panel 250 can respond to these signals by automatically cycling to the "door" display 570b. As with the "restraint" display 570a described above, in some embodiments the "door" display 570b can also include the red border 578 to signal the operator that the loading dock 210 is still being prepared for vehicle access. The display 570b includes a door "open" button 580. Touching the door "open" button 580 causes the control panel 250 to send a command that opens the dock door 246. As noted above, the other loading dock equipment (e.g., the vehicle restraint 242, the dock leveler 216, etc.) is interlocked and is accordingly non-operational while the display 570b is shown. In addition to the door "open" button 580, the touchscreen 354 also displays a "return to restraint" button 581. If the operator decides not to open the dock door 246, the operator can touch the "return to restraint" button 581 and return to the "restraint" display 570a described above for operation of the vehicle restraint 242.

As noted above with reference to FIG. 4, after the dock door 246 has been opened, the control panel system can automatically turn on the loading light 230 and the air curtain 248. Alternatively, the operator can select (i.e., touch) the "options" button 576 to bring up a corresponding display of graphical control elements that enable the operator to manually operate the loading light 230 and/or the air curtain 248.

Figure 5C:
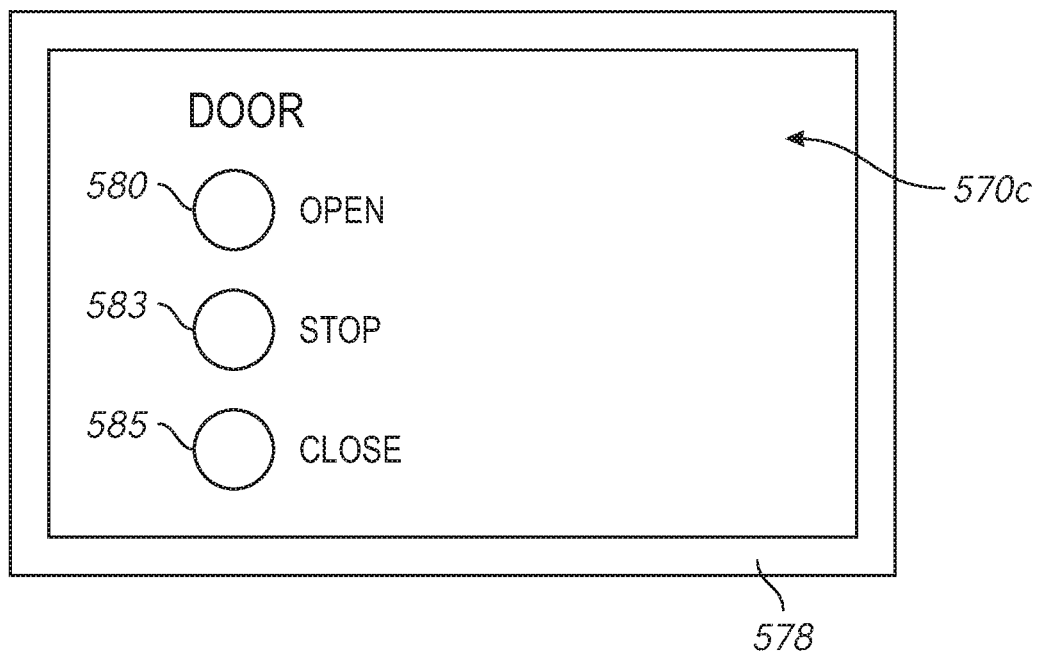

After the operator has touched the door "open" button 580 and the dock door 246 begins rising, the control panel 250 automatically cycles to the "door" display 570c shown in FIG. 5C. The display 570c can include a "door open" button 580, a "door stop" button 583, and a "door close" button 585. While the door 246 is opening, the "door open" button 580 can have an opaque or other visual appearance to signify that it is inoperative. If the operator wishes to stop the door 246 before it is fully open, the operator can do so by touching the "door stop" button 583. Similarly, if the operator wishes to close the door 246, the operator can do so by touching the "door close" button 585.

Figure 5D:
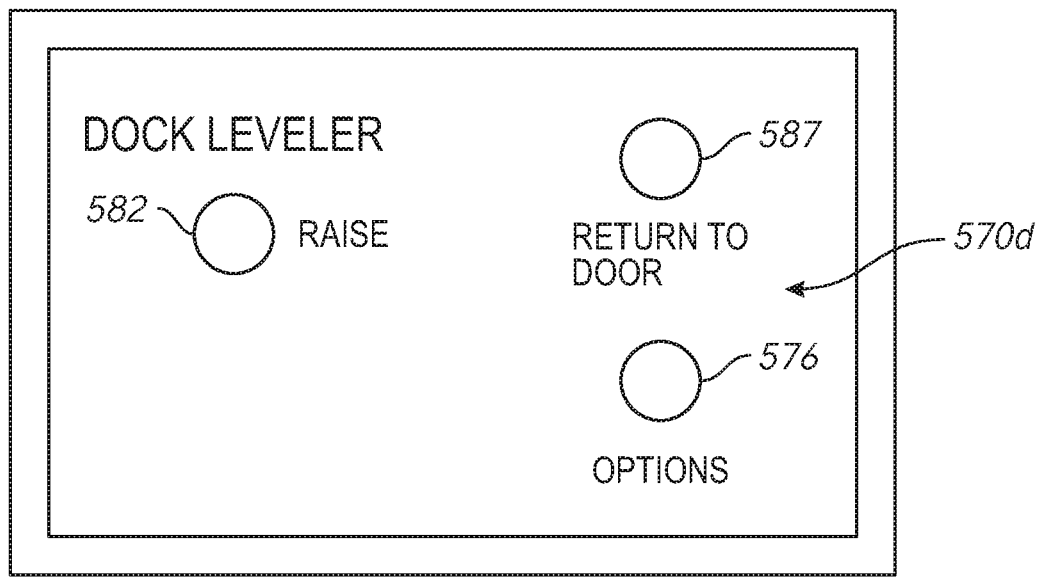

Referring next to FIG. 5D, in the illustrated embodiment the control panel 250 automatically cycles to the "dock leveler" display 570d once the dock door 246 has been fully opened, the loading light 230 is on, and the air curtain 248 is on. Assuming the dock leveler 216 is in a stored position as shown in FIG. 2A, the operator can touch (e.g., press) a "raise" button 582 to raise the dock leveler 216 from the stored position. Alternatively, the operator can touch a "return to door" button 587 if the operator wishes to reverse the sequence and return to the display 570c for operation of the dock door 246 as described above. The operator continues touching the "raise" button 582 for as long as the operator wishes to raise the dock leveler 216. While the dock leveler 216 is in motion, the control panel 250 automatically cycles the touchscreen 354 to the "dock leveler" display 570e shown in FIG. 5E.

Figure 5E:
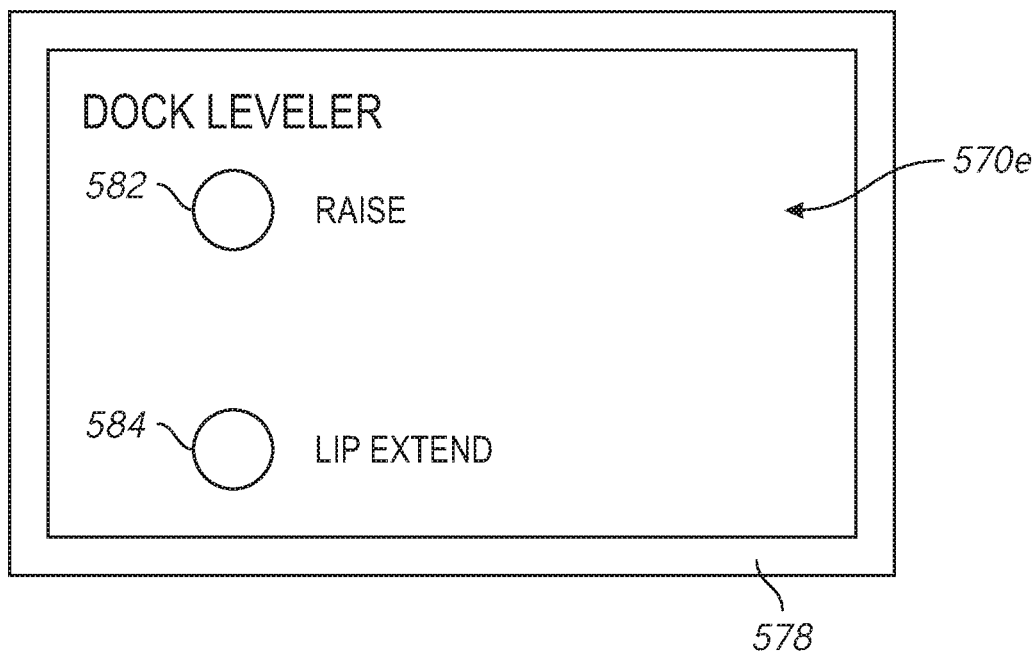

Referring next to FIG. 5E, although the display 570e includes a "lip extend" button 584, this button can have an opaque or other visual appearance to visually indicate that it is inoperable while the operator is raising the dock leveler 216. Once the dock leveler 216 is fully raised, the operator can stop touching the "raise" button 582, which will then render the "lip extend" button 584 operable. Releasing the "raise" button 582 will also allow the dock leveler 216 to descend, and the operator can then touch the "lip extend" button 584 to extend the dock leveler lip 220. Once the lip 220 has been fully extended, the operator can stop touching the "lip extend" button 584 and let the lip 220 come to rest on the bed of the trailer. The touchscreen 354 can continue displaying the red border 578 while the dock leveler 216 is in motion.

Figure 5F:
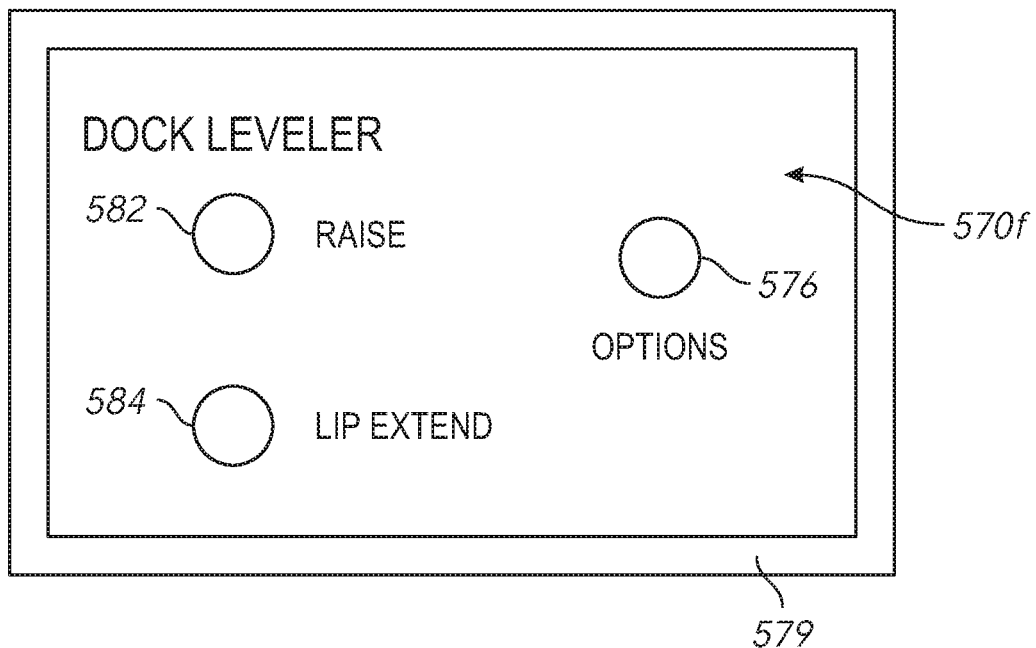

Once the dock leveler 216 is in position in the vehicle, the control panel 250 automatically cycles to the "dock leveler" display 570f shown in FIG. 5F. As noted above with reference to FIG. 4, at this time the control panel 250 can command the barrier gate 226 to automatically raise the gate arm 228 to allow access for workers and/or fork lifts into the trailer. Alternatively, the operator can touch the "options" button 576 if the operator wishes to manually operate the barrier gate 226. Once the dock leveler has been properly installed in the trailer and the barrier gate arm 228 has been raised, the touchscreen 354 can display a green border 579 indicating to the dock operator that it is now safe to enter the trailer and unload and/or load goods, materials, etc. Additionally, during a normal loading and/or unloading process the touchscreen 354 can go into a "sleep mode" in which it displays a visual signal to indicate to the dock operator and other dock workers that the trailer is secure for normal loading and/or unloading procedures. For example, the touchscreen 354 can display a solid or flashing green color to signify the all-safe condition.

Once the unloading and/or loading process is complete, the dock operator can touch the touchscreen 354 to bring up the display 570f shown in FIG. 5F, and touch the "raise" button 582 to lift the dock leveler 216 out of the trailer. While the dock leveler 216 is in motion, the touchscreen 354 can cycle to the display 570e shown in FIG. 5E. In this embodiment, the operator continues touching the "raise" button 582 for the dock leveler 216 to continue moving away from the trailer bed, and then stops touching the "raise" button 582 once the dock leveler 216 has been sufficiently raised so that it can descend to its stored positon in the pit 222. While the dock leveler is in motion, the touchscreen 354 can display the red border 578 as an indication that the dock leveler 216 is not in place yet. As noted above with reference to FIG. 4, once the dock leveler 216 has been fully stored, the dock control system can automatically command the barrier gate 226 to lower the gate arm 228. Alternatively, the operator can touch the "options" button 576 to bring up a corresponding display that enables the operator to manually control the barrier gate 226.

Figure 5G:
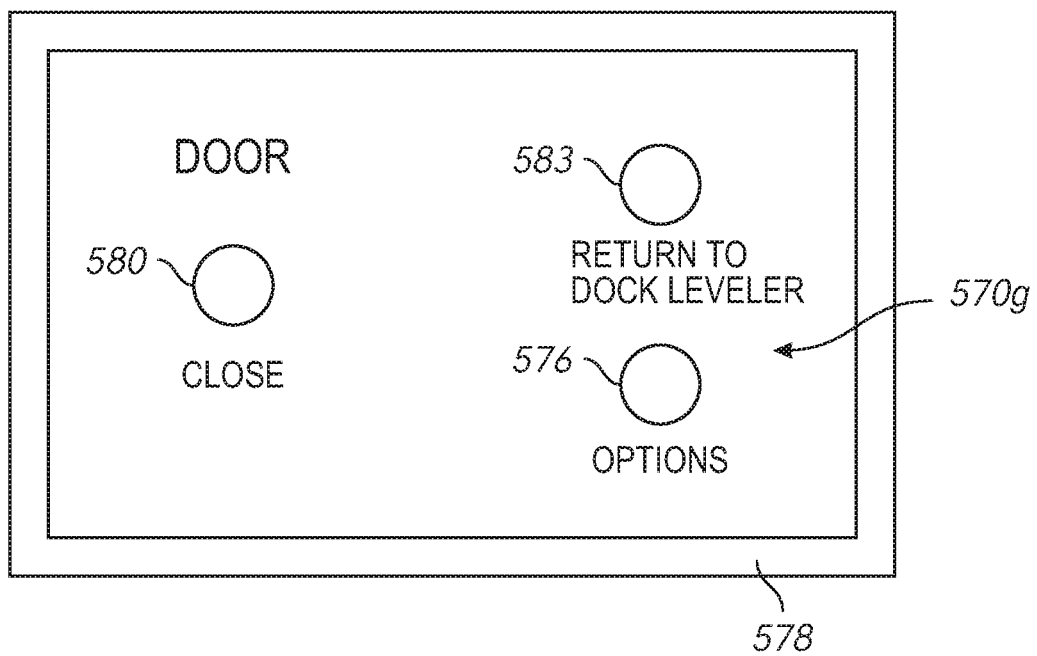

Referring next to FIG. 5G, once the dock leveler 216 has been fully stored, the control panel 250 automatically cycles to the "door" display 570g to enable the operator to close the dock door 246. The display 570g includes a door "close" button 580, a "return to dock leveler" button 583, and the "options" button 576. The operator touches the door "close" button 580 to lower and close the dock door 246. As noted above with reference to FIG. 4, as the door is closing the dock control system can automatically turn off the loading light 230 and the air curtain 248. Alternatively, the operator can elect to manually control one or both of these pieces of equipment by selecting the "options" button 576. Additionally, if for some reason the operator wishes to open the dock door 246 and go back into the trailer, the operator can depress the "return to dock leveler" button 583, which will return to a display of buttons and/or other graphical control elements that enable the operator to open the dock door 246 if the door is closed and reinstall the dock leveler 216 in the trailer.

Figure 5H:
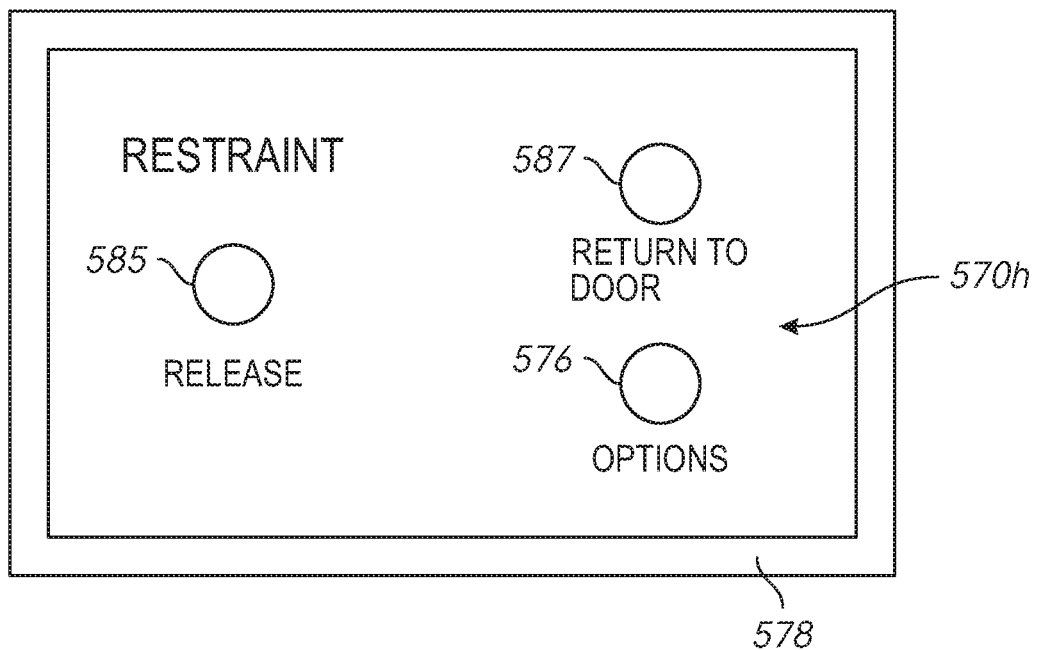

Referring next to FIG. 5H, once the dock door 246 has been fully closed, the control panel 250 automatically cycles to the "restraint" display 570h to enable the operator to release the vehicle restraint 242. More specifically, the touchscreen display 570h includes a "release" button 585, a "return to door" button 587, and the "options" button 576. If for some reason the dock operator wishes to leave the vehicle restraint 242 engaged and re-open the dock door 246, the operator can do so by touching the "return to door" button 587. If instead the dock operator wishes to continue releasing the vehicle, the operator can do so by touching the "release" button 585 to disengage the vehicle restraint 242 from the vehicle. As noted above with reference to FIG. 4, once the vehicle restraint hook 244 has been fully retracted and disengaged from the vehicle, the control system can automatically turn off the guide lights 237a,b and automatically deflate the inflatable shelter 232. Alternatively, if the operator wishes to manually control one or both of these systems, the operator can do so by touching the "options" button 576. The touchscreen 354 continues to display the red border 578 during these operations to signify to the operator and others that the loading dock is not safe for unloading/loading operations at this time.

As the foregoing description of FIGS. 5A-5H demonstrates, embodiments of the control panel 250 described herein can provide a series of touchscreen displays that provide for sequential control of loading dock equipment in an appropriate manner, and prevent, or at least substantially prevent, the operator from inadvertently controlling a piece of equipment that could lead to equipment damage or an unsafe situation. The touchscreens displays described herein can also reduce operator confusion about which piece of equipment should be activated next, and can simplify any operator training that may be required. Although various display sequences and associated graphical and textual elements have been described above by way of examples of some embodiments of the present technology, those of ordinary skill in the art will appreciate that other embodiments can have other display sequences and other arrangements of graphical and textual elements for providing intelligent control of interlocked loading dock equipment without departing from the spirit or scope of the present disclosure. Although one particular sequence of loading dock operations has been described above by way of example, as will be apparent to those of ordinary skill in the art the touchscreen control panel system described herein can be implemented with virtually any arrangement of loading dock equipment and/or any other system of industrial equipment where a particular sequence or order is imperative or desirable, and where the control operator may be confused by a set of controls and/or control decisions at any point in the process. For example, in some embodiments a dock leveler may be used in with an "open" loading dock that lacks a loading dock door. In such embodiments, displays for control of a dock door can be omitted and touchscreen displays for control of the dock leveler can follow touchscreen displays for control of the vehicle restraint.

Although the touchscreen 354 described above is configured to display touch-sensitive graphical control elements (e.g., buttons) that enable an operator to control the associated loading dock equipment by touching the control elements, in other embodiments the touchscreen 354 may be omitted and the touch-sensitive graphical control elements described above in reference to FIGS. 5A-5H can be replaced by non-touch-sensitive control elements (e.g., buttons, icons, etc.) displayed on the display screen 352 that the operator can select by, for example, "clicking" on the control element using a mouse or other known pointing device. In these other embodiments, the display screen 352 can be configured to sequentially present displays that are the same as, or at least similar to, the displays 570a-h described above, with the difference being that the graphical control elements are selected via a pointing device rather than the user's touch. In still further embodiments, the touchscreen 354 may be omitted and the control panel can include one or more multifunction buttons or controls (e.g., manually depressible buttons) positioned adjacent to the display screen 352. In these embodiments, the display screen 352 can cycle through a series of textual prompts that instruct the operator as to which of the buttons the operator should depress to operate the loading dock equipment according to the sequence described above. In these embodiments, the buttons would be "blank," but their functions would change depending on where the dock equipment system was in the process flow, and the display screen 352 would provide textual descriptions of the current button functions. Accordingly, embodiments of the present technology are not limited to use with touchscreens and/or touch-sensitive control elements.

Although the displays 570a-h are depicted as only displaying one graphical control element at a time that is operable to control a corresponding piece of loading dock equipment in response to user selection, in other embodiments one or more of the displays 570a-h can include additional graphical elements that, although they may be visually representative of control elements, are not operable to control other pieces of loading dock equipment. For example, in some embodiments the "restraint" display 570a described above with reference to FIG. 5A can include a representation of a dock door control element. In these embodiments, the representation of the dock door control element will not be selectable (i.e., responsive to touch) by the operator until the vehicle restraint has been properly engaged with the vehicle, at which time the visual representation of the dock door control element will change (e.g., its color will change) to signify to the operator that the dock door control element is now operable. Similarly, the representation of the vehicle restraint control element can also change (e.g., it can become opaque) to signify that it is no longer selectable while the dock door is raised.

In addition to providing efficient controls for loading dock equipment, in other embodiments the touchscreen 354 can also display features (e.g., menus, search fields, etc.) that enable the operator to access a logic diagram, a system schematic, and/or other content that indicates the status of the input and output contacts of the logic sequence at any point in the operation of the loading dock equipment for maintenance and troubleshooting. For example, if some piece of loading dock equipment becomes inoperable and/or the control panel 250 does not appear to be functioning properly, rather than having to open up the control panel to visually inspect the various input and output contacts for the equipment control system directly (and subject the technician to potential injury from, e.g., arc-flash), the technician can instead activate the touchscreen 354 to display a schematic of the input and output contacts at that particular point in the process and identify the source of the problem. Additionally, the touchscreen 354 can be configured to provide other information that would enable the operator to potentially change the operational sequence for various pieces of loading dock equipment, as well as to reconfigure the various touchscreens for a particular application or to remediate a particular malfunction.

The displays 570a-h may be implemented in any of various programming languages, such as in C++, Java, HTML (HyperText Markup Language) or any other suitable scripts or methods of creating displayable data. In addition to the displays 570a-h, the touchscreen 354 and/or the display screen 352 can provide facilities to present information and receive input data, such as a form or page with fields to be filled in, pull-down menus or entries allowing one or more of several options to be selected, buttons, sliders, hypertext links or other known user interface tools for receiving user input. While certain ways of displaying information to users is shown and described with respect to certain Figures, those skilled in the relevant art will recognize that various other alternatives may be employed. The terms "display," "screen," and "page" are generally used interchangeably herein.

Figure 6A:
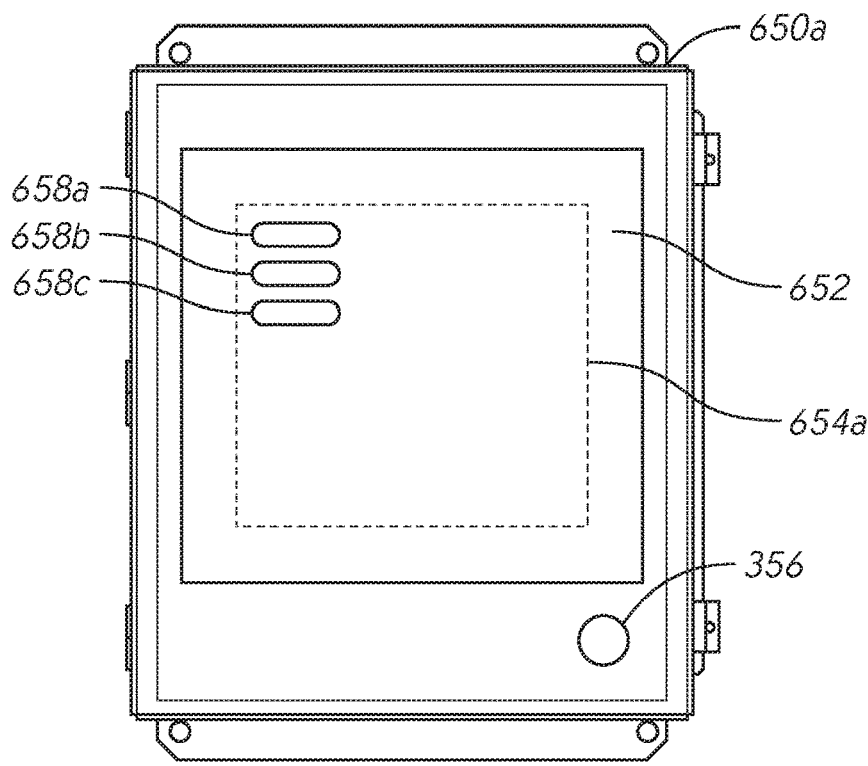
FIGS. 6A-6D are front views of loading dock equipment control panels configured in accordance with other embodiments of the present technology.

The control panel 250 described above with reference to FIG. 3 is one embodiment of a control panel having a touchscreen for providing sequential control of interlocked loading dock equipment in accordance with the present technology. In other embodiments, control panels having user interfaces embodying the present technology can have other configurations and/or arrangements of features without departing from the present disclosure. For example, FIG. 6A-6D are front views of corresponding control panels 650a-650d configured in accordance with other embodiments of the present technology. Referring first to FIG. 6A, in this embodiment the control panel 650a includes a display screen 652 (e.g., a LCD) having a touchscreen 654a in which vehicle restraint status indicators 658a-c are displayed via the touchscreen 654a, instead of being provided via physical lights mounted to the control panel housing, as on the control panel 250 described above with reference to FIG. 3. Like the touchscreen 354 of FIG. 3, the touchscreen 654a can present a series of graphical user interface displays, such as the displays 570a-h described above with reference to FIGS. 5A-5H, for sequential control of loading dock equipment. Although the indicators 658a-c are displayed via the touchscreen 654a, they can be used to visually indicate the status of the vehicle restraint 242 in the same manner as the indicator lights 358a-358c described above with reference to FIG. 3. Accordingly, the first indicator 658a can be configured to project a red color when the vehicle restraint 242 is not engaged with a trailer at the loading dock, the second indicator 658b can be configured to project an amber color indicating that the vehicle restraint 242 is in the override mode and that some other form of restraint is being used to secure the trailer at the loading dock, and the third indicator 658c can be configured to project a green color when the vehicle restraint 242 has been properly engaged with the trailer. In addition to the touchscreen 654a, in this embodiment the control panel 650a also includes the emergency stop button 356 described above with reference to FIG. 3.

Figure 6B:
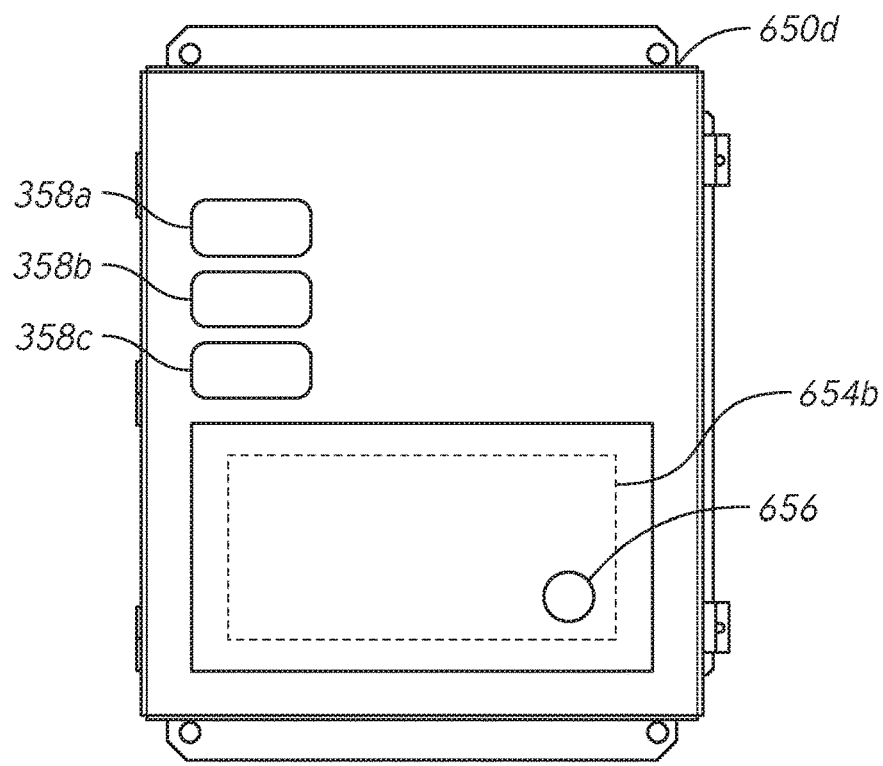
Figure 6C:
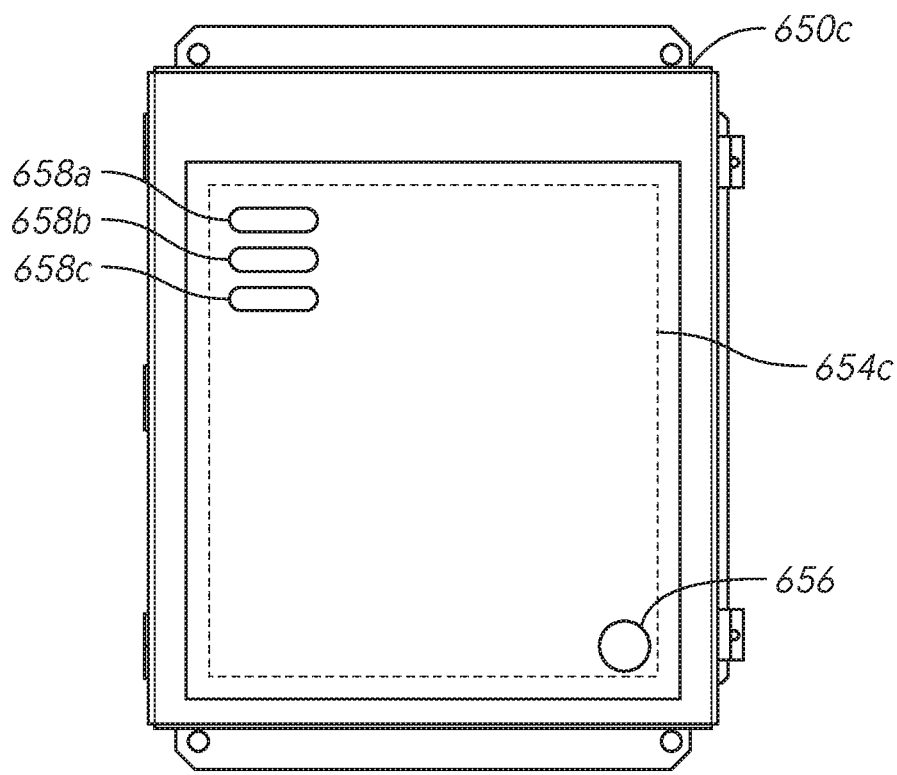

Turning next to FIG. 6B, in this embodiment the control panel 650b includes a touchscreen 654b which displays a graphical emergency stop button 656 instead of a physical button as with the emergency stop button 356 described above with reference to FIGS. 6A and 3. In the embodiment of FIG. 6B, the control panel 650b includes the physical signal lights 358a-c which, like the control panel 250 of FIG. 3, are separate from the touchscreen 654b. Conversely, FIG. 6C illustrates an embodiment of a control panel 650c in which both the indicators 658a-c and the emergency stop button 656 are graphically displayed via a touchscreen 654c.

Figure 6D:
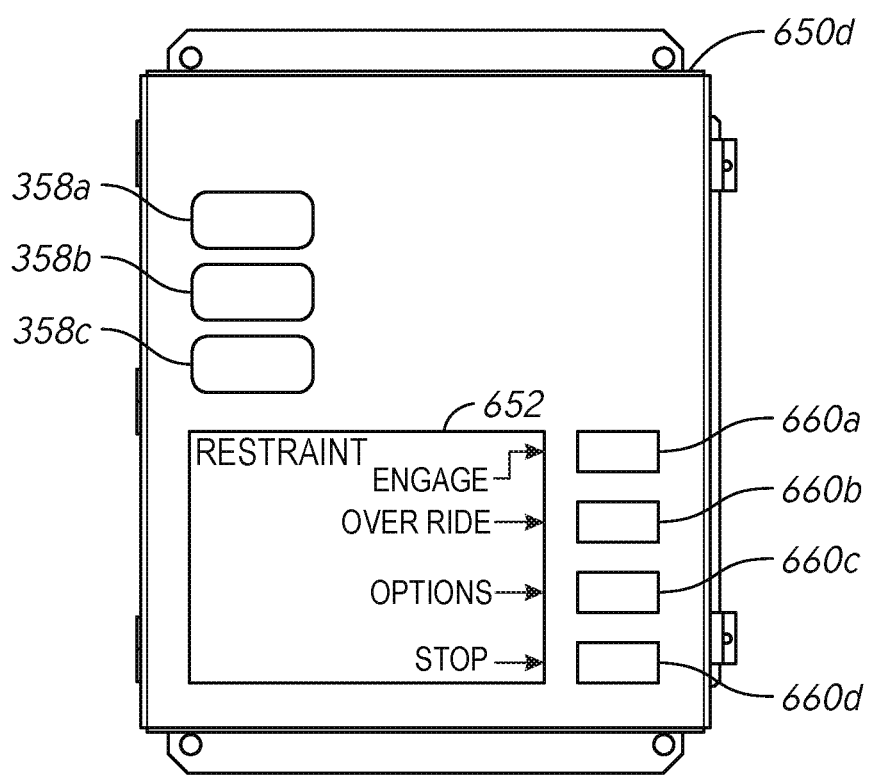

As shown in FIG. 6D, the control panel 650d includes the display screen 652 but lacks a touchscreen. In this embodiment, one or more controllers 660 (e.g., multifunction physical buttons; identified individually as buttons 660a-660d) are arranged alongside or otherwise adjacent to the display screen 652. The display screen 652 is configured to present a series of textual instructions, prompts, etc. that instruct and enable the operator to control loading dock equipment in an appropriate (e.g., safe) sequence by use of the buttons 660a-660d. For example, in the illustrated embodiment the display screen 652 displays textual information for control of the vehicle restraint. The information includes instructions for engaging the vehicle restraint by depressing the first button 660a, or overriding the restraint by depressing the second button 660b. If the user wishes to consider other options, they can do so by selecting the third button 660c. Additionally, the operator can stop all equipment by depressing the fourth button 660d. Once the restraint has been engaged, the display screen 652 can cycle to a new display that provides similar textual information for control of the loading dock door (for example, in a manner that is at least generally similar to the process described above with reference to FIG. 5B). In this embodiment, the functions of the buttons 660a-c will change depending on which piece of dock equipment is associated with a particular display, so that depressing the buttons controls the corresponding piece of equipment. In the embodiment of FIG. 6D, the control panel 650b includes the physical signal lights 358a-c which, like the control panel 250 of FIG. 3, are separate from the display screen 652.

Figure 7:
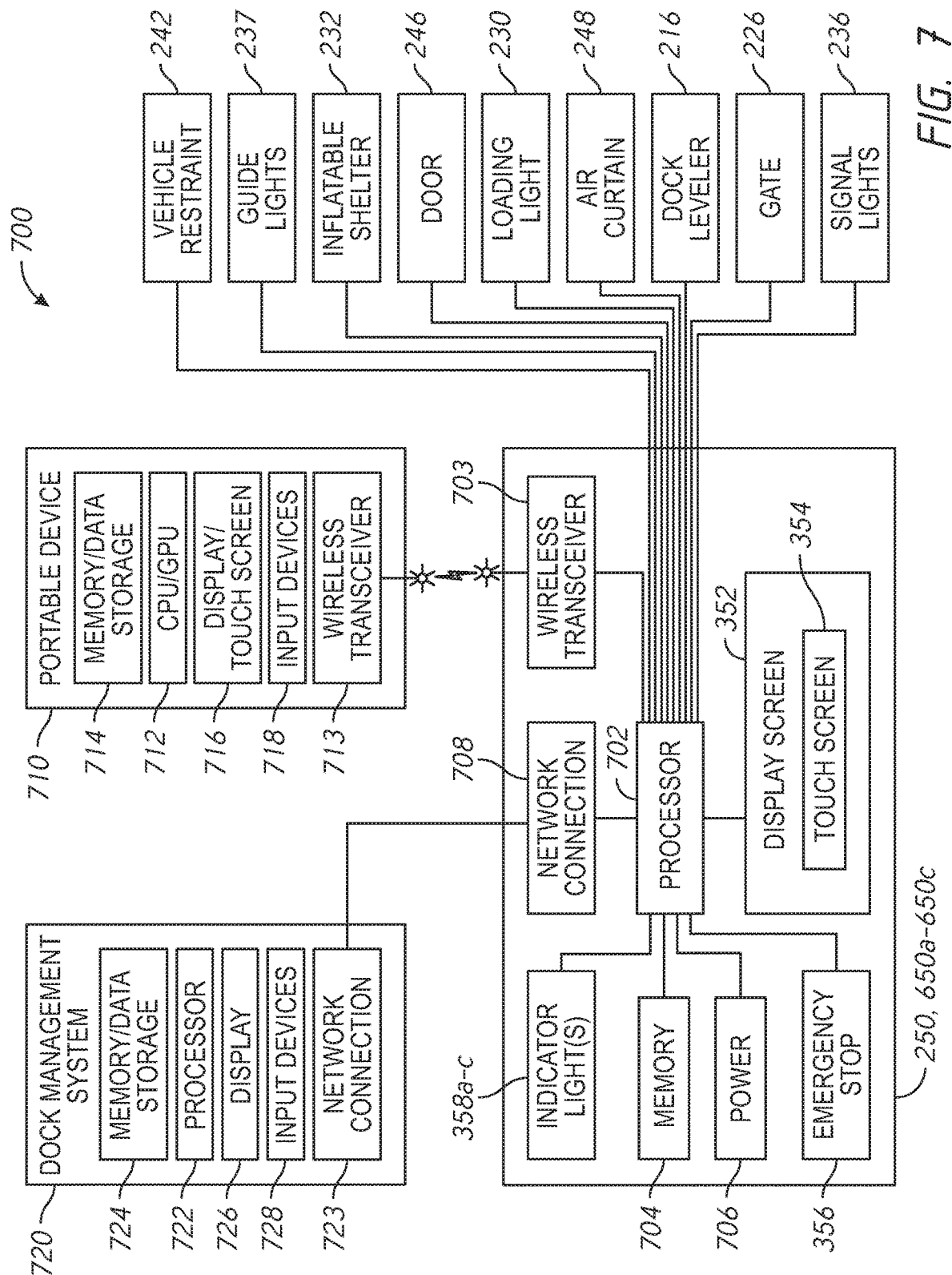
FIG. 7 is a schematic diagram of a loading dock equipment control system configured in accordance with an embodiment of the present technology.

FIG. 7 is a schematic diagram of a loading dock equipment control system 700 on which various embodiments of the present technology can be implemented. The control system 700 includes the control panel 250 (or one of the control panels 650a-650c). Although the discussion that follows refers to the control panel 250, it will be understood that the discussion applies to any of the control panels described herein as well as other control panels configured in accordance with the present technology. The control panel 250 can comprise hardware and software components that execute the dock equipment control methods and systems described in detail above. For example, the control panel 250 can include one or more user input devices, such as the touchscreen 354, physical buttons, switches, etc. that provide user inputs to a processor 702, notifying it of actions. The actions can be mediated by a hardware controller that interprets the signals received from the input devices and communicates the information to the processor 702 using a suitable communication protocol. Although not shown, in other embodiments the control panel 250 can include other input devices such as, for example, a keypad, a touch pad, a joystick, a microphone, and/or other user input devices. The processor 702 may be any suitable logic processing unit, such as one or more programmable logic controllers (PLCs), central processing units (CPUs), digital signal processors (DSPs), application-specific integrated circuits (ASIC), etc.

The control panel processor 702 is operably connected to the indicator lights 358a-c, the emergency stop 356, and the loading dock equipment at the associated loading dock to receive operational signals and provide operating commands to the equipment as described in detail above. This equipment can include, for example, the vehicle restraint 242, the guide lights 237, the inflatable shelter 232, the dock door 246, the loading light 230, the air curtain 248, the dock leveler 216, the gate 226, and the signal lights 236. The communications between the control panel 250 and the various pieces of dock equipment may be facilitated by wired connections, wireless connections, or some combination thereof and can include cellular, Wi-Fi, Bluetooth, or any other conventional or suitable communications protocol known in the art.

The processor 702 can be a single processing unit or multiple processing distributed across multiple devices for performing the routines described above. The processor 702 can be coupled to other hardware devices, for example, with the use of a bus, such as a USB, PCI bus or a SCSI bus. The processor 702 has access to a memory 704 that includes one or more devices for volatile or non-volatile storage, and can include read-only and/or writable memory. The memory 704 can include program memory that stores programs and software for executing the various user input display sequences described above, as well as an operating system, global application modules, and/or other application programs. The processor 702 receives power from a power source 706, which can include facility power or a local power source, such as a battery.

Examples of the display screen 350 include an LCD screen, an LED screen, a projected display, and so on. As discussed above, the touchscreen 354 can be a resistive touchscreen, a capacitive touchscreen, a surface wave touchscreen, and/or other touch-sensitive display and input devices known in the art. By way of example, one suitable touchscreen that can be used with the control panel 250 is a model G307K Kadet 2 Operator Interface with a seven inch TFT (thin film transistor) color display, which can be obtained from Red Lion Controls, Inc. of 20 Willow Springs Circle, York, Pa., 17406, USA. In other embodiments, other suitable touchscreens can be used.

In some embodiments, the control panel 250 can communicate with other devices (or a server) wirelessly or wire-based with a network node. For example, the control panel 250 can include a wireless transceiver 703 and a network connection 708. The wireless transceiver 703 can include a Wi-Fi access point, a Bluetooth transceiver, a near-field communication (NFC) device, and/or a wireless modem or cellular radio utilizing GSM, CDMA, 3G and/or 4G technologies suitable for data communications with, e.g., all manner of remote processing devices. For example, the wireless transceiver 703 can facilitate wireless communication with the portable device 710 when the portable device 710 is either in the proximity of the control panel 250 or remote therefrom. Additionally, the control panel 250 further includes a network connection 708 that can include, for example, a wired connection, such as an Ethernet port, cable modem, Fire Wire cable, Lightning connector, USB port, etc. suitable for wired communication with all manner of remote processing devices, such as the dock management system 720.

In some embodiments, the control system 700 can also include a portable device 710, and/or a dock management system 720. The portable device 710 can be virtually any hand held processing device (e.g., a hand held device such as a smartphone, tablet, or other portable electronic device, etc.) having processing, display, user input/output and remote communication features. For example, in one embodiment the portable device 710 can be a smartphone or other known mobile device having a CPU and/or a graphics processing unit (GPU) 712 for executing computer-readable instructions and application programs stored on memory 714. In addition, the portable device 710 can include an internal power source or battery, a display/touchscreen 716, and various other input devices 718 (e.g., a key pad, microphone, etc.). In addition to the foregoing features, the portable device 710 can include a mobile operating system (OS) and/or a device wireless transceiver 713 that can include one or more antennas for wirelessly communicating with, for example, other mobile devices, websites, and the control panel 250.

In the illustrated embodiment, the dock management system 720 can be a conventional dock management system centrally located at a facility for remotely monitoring and managing activities at a plurality of loading docks at the facility. For example, embodiments of the dock management system 720 can be at least generally similar in structure and function to the systems described in U.S. Pat. No. 7,119,673, which is incorporated herein by reference in its entirety. More specifically, the dock management system can include a CPU or processor 722 that receives user input via various input devices 728, such as a keyboard, touchscreen, mouse, etc., and can display information for user viewing via a display screen 726. The processor 722 can execute computer-readable instructions stored in memory 724. In addition to these features, the dock management system 720 includes a network connection 723 which can be coupled via a wired connection to the network connection 708 of the control panel 250. In other embodiments, the dock management system 720 can communicate with the control panel 250 via a wireless connection. The network connection 723 can also enable the dock management system 720 to connect to a network for exchanging information and/or commands with the control panel 250 and/or other systems. The network may be a public network, such as the Internet, an intranet, a wireless area network (WAN), a local area network (LAN), a telephone system or any other suitable network useful for transporting, communicating or conveying data. In some embodiments, the dock management system 720 and/or portions thereof can be generally similar and structure and function to the 4SIGHT™ Dock Management System provided by 4Front Engineered Solutions, Inc., of 1612 Hutton Drive, Suite 140, Carrollton, Tex. 75006.

As described above with reference to FIGS. 5A-5H, in some embodiments a dock operator located at a particular loading dock can operate the interlocked loading dock equipment via the touchscreen 354 of the control panel 250. In other embodiments, the loading dock equipment can be controlled in accordance with the methods and systems described above by use of the portable device 710. For example, the portable device 710 (e.g., a smartphone) may be carried by a dock operator, or located on a movable piece of equipment such as a lift truck or other inter-plant vehicle. In this embodiment, the portable device 710 contains an application program stored in the memory 714 that, when executed by the CPU 712 enables the dock operator to control the loading dock equipment via the portable device 710 instead of the control panel 250. More specifically, the operator can access the program by touching an appropriate icon on the display 716 and/or inputting, for example, a unique identification code. The CPU 712 can respond to this input by establishing communication with the control panel 250 via the wireless connection between the wireless transceiver 713 and the wireless transceiver 703. The displays 570*a*-570*h* described in detail above can then be displayed for the operator via the display/touchscreen 716 on the portable device 710, and the operator can operate the loading dock equipment in the manner described above via the display/touchscreen 716 on the portable device 710 instead of the control panel 250.

In another embodiment, the portable device 710 (e.g., a tablet, smart phone, etc.) can be detachably mounted to the control panel 250 via a docking station that enables direct electrical connection between the device 710 and the control panel 250. In this embodiment, the operator can interface with the portable device 710 as part of the control panel 250 to control the loading dock equipment, or the operator can detach the portable device 710 from the panel 250 and control the dock equipment remotely.

In a further embodiment, a dock operator can remotely control the loading dock equipment at a particular loading dock via the dock management system 720 (or via the dock management system 720 in combination with local control inputs, either via the control panel 250 or via the nearby wireless device 710). In this embodiment, the dock operator can be located at a central location at the loading dock facility remote from a particular loading dock, but can access the control panel 250 at the loading dock by selecting and/or otherwise inputting an appropriate dock identifier via the dock management display 726 and/or one of the input devices 728. Once communication is established with the control panel 250 at the particular loading dock, the displays 570*a-h* described in detail above with reference to FIGS. 5A-5H can be displayed via the dock management system display 726, and the dock operator can operate the loading dock equipment via the displays 570*a-h* as described above. Since the dock operator is not present at the loading dock in this embodiment, it may be advantageous to include a video camera or other similar viewing device at the loading dock directed toward, e.g., at least the dock door 246 and the dock leveler 216. Images from the camera can be transmitted to the processor 722 and displayed on the display 726 to enable the dock operator to remotely view operation of at least some of the loading dock equipment (e.g.,. the dock leveler 216) during the dock sequence to confirm proper operation.

In the embodiments described above involving use of the portable device 710 and the dock management system 720, the display screen 352 and the touchscreen 354 on the control panel 250 may not be necessary and may be omitted, while the control panel 250 can retain the indicator lights 358*a-c* and the emergency stop 356. Accordingly, one advantage of these embodiments are that the control panel 250 can be less expensive to manufacture since it will not need to include a display or touchscreen. Moreover, in these embodiments a single user interface device (e.g., the portable device 710 or the dock management system 720) can be used to remotely control the loading dock equipment at multiple loading docks at a facility.

Unless described otherwise, the construction and operation of the various components shown in FIG. 7 are of conventional design. As a result, such components need not be described in further detail herein, as they will be readily understood by those skilled in the relevant art. Although specific circuitry is described above, those of ordinary skill in the art will recognize that a microprocessor-based system could also be used where any logical decisions are configured in software.

The disclosed technology is operational with numerous other general purpose or special purpose computing system environments or configurations. Examples of well-known computing systems, environments, and/or configurations that may be suitable for use with the technology include, but are not limited to, personal computers, server computers, hand held or laptop devices, cellular telephones, wearable electronics, tablet devices, multiprocessor systems, microprocessor-based systems, set-top boxes, programmable consumer electronics, network PCs, minicomputers, mainframe computers, distributed computing environments that include any of the above systems or devices, and the like. The foregoing discussion provides a brief, general description of a suitable computing environment in which the invention can be implemented. Although not required, aspects of the invention are described in the general context of computer-executable instructions, such as routines executed by a general-purpose data processing device, e.g., a PLC, wireless device, personal computer or server computer. Those skilled in the relevant art will appreciate that aspects of the invention can be practiced with other data processing, communications, or computer system configurations, including: Internet appliances, hand-held devices (including personal digital assistants (PDAs)), wearable computers, all manner of cellular or mobile phones (including Voice over IP (VoIP) phones), dumb terminals, media players, multi-processor systems, microprocessor-based or programmable consumer electronics, network PCs, mini-computers, mainframe computers, and the like. Indeed, the terms "computer," "processor" and the like are generally used interchangeably herein, and can refer to any of the above devices and systems, as well as any data processor.

The above Detailed Description of examples and embodiments of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times.

Aspects of the invention can be embodied in a special purpose computer or data processor that is specifically programmed, configured, or constructed to perform one or more of the computer-executable instructions explained in detail herein. While aspects of the invention, such as certain functions, are described as being performed exclusively on a single device, the invention can also be practiced in distributed environments where functions or modules are shared among disparate processing devices, which are linked through a communications network, such as a Local Area Network (LAN), Wide Area Network (WAN), or the Internet. In a distributed computing environment, program modules may be located in both local and remote memory storage devices.

Aspects of the invention may be stored or distributed on tangible computer-readable media (e.g., non-transitory computer-readable media), including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

The terminology used herein is to be interpreted in its broadest reasonable manner, even though it is being used in conjunction with a detailed description of certain examples of embodiments of the technology. Indeed, certain terms may even be emphasized below; however, any terminology intended to be interpreted in any restricted manner will be overtly and specifically defined as such in this Detailed Description section.

References throughout the foregoing description to features, advantages, or similar language do not imply that all of the features and advantages that may be realized with the present technology should be or are in any single embodiment of the invention. Rather, language referring to the features and advantages is understood to mean that a specific feature, advantage, or characteristic described in connection with an embodiment is included in at least one embodiment of the present technology. Thus, discussion of the features and advantages, and similar language, throughout this specification may, but do not necessarily, refer to the same embodiment. Furthermore, the described features, advantages, and characteristics of the present technology may be combined in any suitable manner in one or more embodiments. One skilled in the relevant art will recognize that the present technology can be practiced without one or more of the specific features or advantages of a particular embodiment. In other instances, additional features and advantages may be recognized in certain embodiments that may not be present in all embodiments of the present technology.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements. Further any specific numbers noted herein are only examples: alternative implementations may employ differing values or ranges.

While the above description describes various embodiments of the invention and the best mode contemplated, regardless how detailed the above text, the invention can be practiced in many ways. Details of the system may vary considerably in its specific implementation, while still being encompassed by the present disclosure. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

From the foregoing, it will be appreciated that specific embodiments of the invention have been described herein for purposes of illustration, but that various modifications may be made without deviating from the spirit and scope of the various embodiments of the invention. Accordingly, the invention is not limited, except as by the appended claims. Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

We claim:

1. A control panel for controlling operation of loading dock equipment at a loading dock, the loading dock equipment including at least a first piece of loading dock equipment and a second piece of loading dock equipment, wherein the control panel comprises:
    a display screen configured to sequentially display a first control element and then, after user interaction with the first control element, display a second control element and a third control element, wherein the user interaction with the first control element causes activation of a first function of the first piece of loading dock equipment and causes the display screen to concurrently display the second and third control elements in the absence of the first control element, wherein user interaction with the second control element causes activation of the second piece of loading dock equipment, wherein the third control element is operable to control the display screen and user interaction with the third control element causes the display screen to display a fourth control element in the absence of the second control element, and wherein user interaction with the fourth control element is operable to control a second function of the first piece of loading dock equipment different than the first function.

2. The control panel of claim 1 wherein the display screen is configured to display a series of control elements for operating the loading dock equipment according to a preset sequence, the series of control elements including the first control element and the second control element.

3. The control panel of claim 1 wherein the display screen is configured to display a series of control elements for operating the loading dock equipment according to a preset sequence, the series of control elements including the first control element and the second control element, and wherein the display screen only displays either the first or second control element at any given time.

4. The control panel of claim 1 wherein the display screen is configured to display an inoperative representation of the second control element while the first control element is displayed.

5. The control panel of claim 1 wherein the second piece of loading dock equipment is interlocked with the first piece of loading dock equipment, such that the second piece of loading dock equipment cannot be activated until the first piece of loading dock equipment has been activated.

6. The control panel of claim 1 wherein the loading dock equipment includes at least a vehicle restraint, a loading dock door, and a dock leveler, and wherein the control panel is mounted proximate to the loading dock.

7. The control panel of claim 6 wherein the loading dock door is interlocked with the vehicle restraint such that the loading dock door is inoperable until the control panel receives a signal from the vehicle restraint indicating that the vehicle restraint has been properly engaged with a vehicle.

8. The control panel of claim 1 wherein the control panel is part of a hand held device that includes the display screen.

9. The control panel of claim 1 wherein the control panel is part of a hand held device that includes the display screen, and wherein the hand held device is detachably mounted to a docking station adjacent to the loading dock.

10. The control panel of claim 1 wherein the control panel is part of a mobile phone that includes the display screen.

11. The control panel of claim 1 wherein the control panel is part of a central dock management system located remote from the loading dock, and wherein the dock management system includes the display screen.

12. The control panel of claim 1 wherein the display screen only displays either the first or second control element at any given time.

13. The control panel of claim 1 wherein user interaction with the first control element causes activation of the first piece of loading dock equipment in a first direction, and wherein user interaction with the fourth control element causes activation of the first piece of loading dock equipment in a second direction.

14. The control panel of claim 1, further comprising a third piece of loading dock equipment, wherein activation of the first piece of loading dock equipment causes automatic operation of the third piece of loading dock equipment, and wherein the third piece of loading dock equipment is at least one of an air curtain, a guide light, a loading light, an inflatable shelter, or a dock gate.

15. The control panel of claim 14 wherein the first piece of loading dock equipment is a vehicle restraint and the third piece of loading dock equipment is an inflatable shelter, and wherein automatic operation of the third piece of loading dock equipment causes the inflatable shelter to inflate.

16. A system for controlling operation of loading dock equipment at a loading dock, the system comprising:
    a display screen;
    a processor operably connectable to the display screen; and
    a computer-readable medium containing instructions that cause the processor to— display, via the display screen, a first control element in the absence of a second control element and a third control element, wherein— the first control element is associated with a first piece of loading dock equipment, the second control element is associated with a second piece of loading dock equipment, and the third control element is associated with the display screen, and selection of the first control element by a user causes the processor to activate a first functional operation of the first piece of loading dock equipment to the exclusion of the second piece of loading dock equipment; and after the first functional operation of the first piece of loading dock equipment, concurrently display, via the display screen, the second and third control elements in the absence of the first control element, wherein selection of the second control element by the user causes the processor to activate operation of the second piece of loading dock equipment to the exclusion of the first piece of loading dock equipment, wherein selection of the third control element by the user causes the processor to display, via the display screen, a fourth control element in the absence of the second control element, and wherein the fourth control element is associated with the first piece of loading dock equipment and selection of the fourth control element by the user causes the processor to activate a second function of the first piece sit loading dock equipment different than the first function.

17. The system of claim 16 wherein the instructions cause the processor to display, via the display screen, either the first control element or the second control element at a time.

18. The system of claim 16 wherein the display screen is a touchscreen, and wherein the first and second control elements are touch-sensitive control elements.

19. The system of claim 16 wherein the first piece of loading dock equipment is a vehicle restraint and the second piece of loading dock equipment is a loading dock door, and wherein the system further comprises:

the vehicle restraint, wherein the vehicle restraint is operably connected to the processor, wherein the first control element is selectable by the user to cause the vehicle restraint to engage a vehicle parked at the loading dock, and wherein the fourth control element is selectable by the user to cause the vehicle restraint to disengage from the vehicle parked at the loading dock; and the loading dock door, wherein the loading dock door is operably connected to the processor and positioned above the vehicle restraint, wherein the second control element is selectable by the user to cause the loading dock door to open and provide access to the vehicle from the loading dock, and wherein the second control element is not displayed until after the vehicle has been properly engaged by the vehicle restraint.

20. The system of claim 16 wherein the first piece of loading dock equipment is a vehicle restraint and the second piece of loading dock equipment is a dock leveler, and wherein the system further comprises:

the vehicle restraint, wherein the vehicle restraint is operably connected to the processor, wherein the first control element is selectable by the user to cause the vehicle restraint to engage a vehicle parked at the loading dock, and wherein the fourth control element is selectable by the user to cause the vehicle restraint to disengage from the vehicle parked at the loading dock; and the dock leveler, wherein the dock leveler is operably connected to the processor, wherein the second control element is selectable by the user to cause the dock leveler to move into position to provide access to the vehicle from the loading dock, and wherein the second control element is not displayed until after the vehicle has been properly engaged by the vehicle restraint.

21. The system of claim 16 wherein the instructions further cause the processor to, after operation of the second piece of loading dock equipment, display, via the display screen, a fifth control element to the exclusion of the first, second, and fourth control elements, wherein selection of the fifth control element by the user causes the processor to activate a third piece of loading dock equipment to the exclusion of the first and second pieces of loading dock equipment.

22. The system of claim 21 wherein the first piece of loading dock equipment is a vehicle restraint, the second piece of loading dock equipment is a loading dock door, and the third piece of loading dock equipment is a dock leveler, and wherein the instructions cause the processor to sequentially display, via the display screen, all of the control elements necessary for the user to fully operate the vehicle restraint, the loading dock door, and the dock leveler.

23. The system of claim 21 wherein the first piece of loading dock equipment is a vehicle restraint, the second piece of loading dock equipment is a loading dock door, and the third piece of loading dock equipment is a dock leveler, and wherein the system further comprises:

the vehicle restraint, wherein the vehicle restraint is operably connected to the processor, wherein the first control element is selectable by the user to cause the vehicle restraint to engage a vehicle parked at the loading dock;

the loading dock door, wherein the loading dock door is operably connected to the processor and positioned above the vehicle restraint, wherein the second control element is selectable by the user to cause the loading dock door to raise and provide access to the vehicle from the loading dock, and wherein the second control element is not displayed until after the vehicle has been properly engaged by the vehicle restraint; and the dock leveler, wherein the dock leveler is operably connected to the processor, wherein the fifth control element is selectable by the user to cause the dock leveler to extend into the vehicle, and wherein the fifth control element is not displayed until after the dock door has been raised.

24. The system of claim 16, further comprising a third piece of loading dock equipment, wherein operation of the first piece of loading dock equipment causes the processor to automatically activate operation of the third piece of loading dock equipment, and wherein the third piece of loading dock equipment is at least one of an air curtain, a guide light, a loading light, an inflatable shelter, or a dock gate.

25. The system of claim 24 wherein the first piece of loading dock equipment is a vehicle restraint and the third piece of loading dock equipment is a vehicle parking guide light, and wherein the system further comprises:

the vehicle restraint, wherein the vehicle restraint is operably connected to the processor, and wherein the first control element is selectable by the user to cause the vehicle restraint to engage a vehicle parked at the loading dock; and the vehicle parking guide light, wherein the vehicle parking guide light is operably connected to the processor, and wherein automatic operation of the third piece of loading dock equipment causes the vehicle parking guide light to turn off.

26. The system of claim 24 wherein the first piece of loading dock equipment is a loading dock door and the third piece of loading dock equipment is an air curtain, and wherein the system further comprises:
the loading dock door, wherein the vehicle restraint is operably connected to the processor, and wherein the first control element is selectable by the user to cause the loading dock door to open; and
the air curtain, wherein the air curtain is operably connected to the processor, and wherein automatic operation of the third piece of loading dock equipment causes the air curtain to activate.

27. A computer-implemented method for sequentially operating loading dock equipment, the method comprising:
displaying a first graphical control element via a display screen, wherein the first graphical control element enables user operation of a first piece of loading dock equipment to the exclusion of a second piece of loading dock equipment, separate from the first piece of loading dock equipment, and wherein the first graphical control element is displayed in the absence of a second graphical control element that enables user operation of the second piece of loading dock equipment and in the absence of a third graphical control element that enables user control of the display screen;
receiving a first user selection of the first graphical control element;
in response to receiving the first user selection, activating a first function of the first piece of loading dock equipment;
after activation of the function of the first piece of loading dock equipment, displaying the second and third graphical control elements via the display screen in the absence of the first graphical control element; and
receiving a second user selection of either—
the second graphical control element, and in response activating the second piece of loading dock equipment, or
the third graphical control element, operable to control the display screen, and in response displaying a fourth graphical control element in the absence of the second graphical control element, wherein the fourth graphical control element enables user operation of a second function of the first piece of loading dock equipment, different than the first function, and to the exclusion of the second piece of loading dock equipment.

28. The method of claim 27 wherein displaying the first graphical control element includes displaying a first touch-sensitive button via a touchscreen, and wherein displaying the second and third graphical control elements includes displaying second and third touch-sensitive buttons, respectively, via the touchscreen after the user has touched the first touch-sensitive button to operate the first piece of loading dock equipment.

29. The method of claim 27 wherein the first piece of loading dock equipment is a vehicle restraint and the second piece of loading dock equipment is a loading dock door, and wherein
activating the first piece of loading dock equipment comprises engaging the vehicle restraint with a vehicle parked at the loading dock, wherein displaying the second and third graphical control elements includes displaying the second and third graphical control elements after the vehicle has been engaged by the vehicle restraint, and
wherein activating the second piece of loading dock equipment comprises raising the loading dock door to provide access to the vehicle.

30. The method of claim 27 wherein displaying the first, second, third, and fourth graphical control elements includes displaying the first, second, third, and fourth graphical control elements on a display screen of a mobile device.

31. The method of claim 27 wherein displaying the first, second, third, and fourth graphical control elements includes displaying the first, second, third and fourth graphical control elements on a display screen of a dock management system computer remote from the loading dock.

32. The method of claim 27 wherein the first piece of loading dock equipment is a vehicle restraint and the second piece of loading dock equipment is a dock leveler, wherein—
activating the first piece of loading dock equipment comprises engaging the vehicle restraint with a vehicle parked at the loading dock, wherein displaying the second and third graphical control elements includes displaying the second and third graphical control elements after the vehicle has been engaged by the vehicle restraint, and
the method further comprises receiving a third user selection of the fourth graphical control element, and in response disengaging the vehicle restraint from the vehicle parked at the loading dock.

33. The method of claim 27, further comprising automatically operating a third piece of loading dock equipment in response to activation of the first piece of loading dock equipment, and wherein the third piece of loading dock equipment is at least one of an air curtain, a vehicle parking guide light, a loading light, an inflatable shelter, or a dock gate.

34. The method of claim 33 wherein the first piece of loading dock equipment is a loading dock door and the third piece of loading dock equipment is a loading light, wherein activating the first piece of loading dock equipment comprises opening the loading dock door, and wherein automatic operation of the third piece of loading dock equipment comprises turning on the loading light.

* * * * *